US012549922B2

United States Patent
El Essaili et al.

(10) Patent No.: US 12,549,922 B2
(45) Date of Patent: Feb. 10, 2026

(54) NETWORK NODE, VEHICLE TO EVERYTHING WIRELESS DEVICE AND METHODS PERFORMED THEREIN

(71) Applicant: Telefonaktiebolaget LM Ericsson (publ), Stockholm (SE)

(72) Inventors: Ali El Essaili, Aachen (DE); Yunpeng Zang, Wuerselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 840 days.

(21) Appl. No.: 17/595,300

(22) PCT Filed: Dec. 23, 2019

(86) PCT No.: PCT/SE2019/051338
§ 371 (c)(1),
(2) Date: Nov. 12, 2021

(87) PCT Pub. No.: WO2020/231308
PCT Pub. Date: Nov. 19, 2020

(65) Prior Publication Data
US 2022/0210601 A1    Jun. 30, 2022

Related U.S. Application Data

(60) Provisional application No. 62/846,774, filed on May 13, 2019.

(51) Int. Cl.
*H04W 4/00* (2018.01)
*H04W 4/021* (2018.01)
(Continued)

(52) U.S. Cl.
CPC ............. *H04W 4/021* (2013.01); *H04W 4/08* (2013.01); *H04W 4/44* (2018.02)

(58) Field of Classification Search
CPC .......... H04W 4/021; H04W 4/08; H04W 4/44
See application file for complete search history.

(56) References Cited

U.S. PATENT DOCUMENTS

| 9,414,347 B2 | 8/2016 | Rembarz et al. |
| 2014/0050142 A1 | 2/2014 | Song et al. |
(Continued)

FOREIGN PATENT DOCUMENTS

| CN | 102833687 A | 12/2012 |
| CN | 107295460 A | 10/2017 |
(Continued)

OTHER PUBLICATIONS

Notice of Allowance, KR App. No. 10-2021-7040263, Sep. 12, 2023, 8 pages (1 page of English Translation and 7 pages of Original Document).
(Continued)

*Primary Examiner* — Omoniyi Obayanju
(74) *Attorney, Agent, or Firm* — Nicholson De Vos Webster & Elliott LLP

(57) ABSTRACT

A method performed by a vehicle to everything (V2X) wireless device for handling a service in a wireless communication network. The V2X wireless device receives from a network node an announcement message comprising data relating to a group of wireless devices; and transmits to the network node a response to the received announcement message for registering to the group of wireless devices.

17 Claims, 15 Drawing Sheets

(51) Int. Cl.
H04W 4/08 (2009.01)
H04W 4/44 (2018.01)

(56) References Cited

U.S. PATENT DOCUMENTS

| | | | |
|---|---|---|---|
| 2015/0189615 | A1 | 7/2015 | Rembarz et al. |
| 2016/0021620 | A1* | 1/2016 | Chen .................. H04W 52/146 |
| | | | 455/522 |
| 2016/0285935 | A1 | 9/2016 | Wu et al. |
| 2017/0295531 | A1 | 10/2017 | Singh et al. |
| 2018/0124656 | A1 | 5/2018 | Park et al. |
| 2018/0159935 | A1 | 6/2018 | Cavalcanti et al. |
| 2018/0167790 | A1 | 6/2018 | Cavalcanti et al. |
| 2018/0310241 | A1 | 10/2018 | Yu et al. |
| 2019/0037448 | A1 | 1/2019 | Shan et al. |
| 2019/0090099 | A1* | 3/2019 | Wang ...................... H04W 4/40 |
| 2019/0124489 | A1 | 4/2019 | Ahmad et al. |
| 2019/0313359 | A1* | 10/2019 | Lee ........................ H04W 76/14 |
| 2019/0349719 | A1* | 11/2019 | Pattan ..................... H04W 4/70 |
| 2021/0134159 | A1* | 5/2021 | Cao ......................... H04W 4/40 |

FOREIGN PATENT DOCUMENTS

| | | |
|---|---|---|
| CN | 107710795 A | 2/2018 |
| KR | 10-2015-0072809 A | 6/2015 |
| KR | 10-2017-0130428 A | 11/2017 |
| KR | 10-2017-0139665 A | 12/2017 |
| WO | 2016/209314 A1 | 12/2016 |
| WO | 2017/052690 A1 | 3/2017 |
| WO | 2018202798 A1 | 11/2018 |
| WO | 2019/006085 A1 | 1/2019 |
| WO | 2020231309 A1 | 11/2020 |

OTHER PUBLICATIONS

Communication pursuant to Article 94(3) EPC, EP Application No. 19829706.1, May 4, 2022, 6 pages.
Communication under Rule 71(3) EPC, EP Application No. 19829706.1, Mar. 28, 2023, 8 pages.
Communication under Rule 71(3) EPC, EP Application No. 19829707.9, May 25, 2022, 7 pages.
Decision of Rejection, JP App. No. 2021-567793, Apr. 25, 2023, 11 pages (4 pages of English Translation and 7 pages of Original Document).
Decision to grant, EP Application No. 19829707.9, Sep. 29, 2022, 2 pages.
Office Action, CA App. No. 3140380, Dec. 28, 2022, 3 pages.
Office Action, JP App. No. 2021-567793, Dec. 20, 2022, 17 pages (05 pages of English Translation and 12 pages of Original Document).
Request for the Submission of an Opinion, KR App. No. 10-2021-7040263, Mar. 8, 2023, 13 pages (7 pages of English Translation and 6 pages of Original Document).
TSG SA WG6, "Presentation of TR 23.795 v2.0.0 for approval: Study on application layer support for V2X services", 3GPP TSG-SA Meeting #81, SP-180682, Sep. 12-14, 2018, 10 pages, Gold Coast, Australia.
Written Opinion of the International Preliminary Examining Authority for Application No. PCT/SE2019/051338, dated Mar. 17, 2021, 6 pages.
Written Opinion of the International Preliminary Examining Authority for Application No. PCT/SE2019/051339, dated Mar. 24, 2021, 7 pages.
ISO TS 17419: "Intelligent Transport Systems—Cooperative systems—Classification and management of ITS applications in a global context," Apr. 15, 2014, 48 pages, Technical Specification, ISO.
Office Action with Search Report, CN App. No. 201980096353.7, Nov. 1, 2023, 10 pages of Original Document only.
Office Action with Search Report, CN App. No. 201980096354.1, Oct. 21, 2023, 10 pages of Original Document only.

Examination Report, IN App. No. 202147056979, Jun. 13, 2023, 6 pages.
International Search Report and Written Opinion for Application No. PCT/SE2019/051338, dated Mar. 20, 2020, 11 pages.
International Search Report and Written Opinion for Application No. PCT/SE2019/051339, dated Mar. 9, 2020, 11 pages.
International Preliminary Report on Patentability for Application No. PCT/SE2019/051338, dated May 18, 2021, 51 pages.
International Preliminary Report on Patentability for Application No. PCT/SE2019/051339, dated Apr. 30, 2021, 11 pages.
3GPP TR 21.905 V15.1.0, "3rd Generation Partnership Project; Technical Specification Group Services and System Aspects; Vocabulary for 3GPP Specifications (Release 15)," Dec. 2018, 65 pages, 3GPP Organizational Partners.
3GPP TR 23.795 V16.1.0, "3rd Generation Partnership Project; Technical Specification Group Services and System Aspects; Study on application layer support for V2X services; (Release 16)," Dec. 2018, 77 pages, 3GPP Organizational Partners.
3GPP TR 22.185 V15.0.0, "3rd Generation Partnership Project; Technical Specification Group Services and System Aspects; Service requirements for V2X services; Stage 1 (Release 15)," Jun. 2018, 14 pages, 3GPP Organizational Partners.
3GPP TS 22.186 V16.1.0, "3rd Generation Partnership Project; Technical Specification Group Services and System Aspects; Enhancement of 3GPP support for V2X scenarios; Stage 1 (Release 16)," Dec. 2018, 18 pages, 3GPP Organizational Partners.
3GPP TS 23.280 V16.2.0, "3rd Generation Partnership Project; Technical Specification Group Services and System Aspects; Common functional architecture to support mission critical services; Stage 2 (Release 16)," Mar. 2019, 210 pages, 3GPP Organizational Partners.
3GPP TS 23.285 V16.0.0, "3rd Generation Partnership Project; Technical Specification Group Services and System Aspects; Architecture enhancements for V2X services (Release 16)," Mar. 2019, 37 pages, 3GPP Organizational Partners.
3GPP TS 23.286 V1.1.0, "3rd Generation Partnership Project; Technical Specification Group Services and System Aspects; Application layer support for V2X services; Functional architecture and information flows; (Release 16)," Apr. 2019, 55 pages, 3GPP Organizational Partners.
3GPP TS 23.434 V1.1.0, "3rd Generation Partnership Project; Technical Specification Group Services and System Aspects; Service Enabler Architecture Layer for Verticals; Functional architecture and information flows; (Release 16)," Apr. 2019, 89 pages, 3GPP Organizational Partners.
3GPP TS 23.468 V15.0.0, "3rd Generation Partnership Project; Technical Specification Group Services and System Aspects; Group Communication System Enablers for LTE (GCSE_LTE); Stage 2 (Release 15)," Dec. 2017, 32 pages, 3GPP Organizational Partners.
3GPP TS 23.682 V16.2.0, "3rd Generation Partnership Project; Technical Specification Group Services and System Aspects; Architecture enhancements to facilitate communications with packet data networks and applications (Release 16)," Mar. 2019, 126 pages, 3GPP Organizational Partners.
3GPP TS 24.386 V15.2.0, "3rd Generation Partnership Project; Technical Specification Group Core Network and Terminals; User Equipment (UE) to V2X control function; protocol aspects; Stage 3 (Release 15)," Dec. 2018, 35 pages, 3GPP Organizational Partners.
3GPP TS 26.346 V16.1.0, "3rd Generation Partnership Project; Technical Specification Group Services and System Aspects; Multimedia Broadcast/Multicast Service (MBMS); Protocols and codecs (Release 16)," Mar. 2019, 257 pages, 3GPP Organizational Partners.
3GPP TS 26.348 V16.1.0, "3rd Generation Partnership Project; Technical Specification Group Services and System Aspects; Northbound Application Programming Interface (API) for Multimedia Broadcast/Multicast Service (MBMS) at the xMB reference point (Release 16)," Mar. 2019, 45 pages, 3GPP Organizational Partners.
3GPP TS 29.214 V15.6.0, "3rd Generation Partnership Project; Technical Specification Group Core Network and Terminals; Policy and Charging Control over Rx reference point (Release 15)," Mar. 2019, 89 pages, 3GPP Organizational Partners.
3GPP TS 29.468 V15.5.0, "3rd Generation Partnership Project; Technical Specification Group Core Network and Terminals; Group

(56) References Cited

OTHER PUBLICATIONS

Communication System Enablers for LTE (GCSE_LTE); MB2 Reference Point; Stage 3 (Release 15)," Mar. 2019, 43 pages, 3GPP Organizational Partners.

3GPP TS 36.300 V15.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Mar. 2019, 363 pages, 3GPP Organizational Partners.

ETSI EN 302 637-3 V1.3.1, "Intelligent Transport Systems (ITS); Vehicular Communications; Basic Set of Applications; Part 3: Specifications of Decentralized Environmental Notification Basic Service," Apr. 2019, 74 pages, ETSI.

ETSI TS 102 894-2 V1.2.1, "Intelligent Transport Systems (ITS); Users and applications requirements; Part 2: Applications and facilities layer common data dictionary," Sep. 2014, 94 pages, European Telecommunications Standards Institute.

ETSI TS 102 965 V1.4.1, "Intelligent Transport Systems (ITS); Application Object Identifier (ITS-AID); Registration," Nov. 2018, 8 pages, ETSI.

Non-Final Office Action, U.S. Appl. No. 17/595,302, Jan. 17, 2024, 20 pages.

Notice of Allowance, U.S. Appl. No. 17/595,302, Jul. 5, 2024, 17 pages.

Corrected Notice of Allowability, U.S. Appl. No. 17/595,302, Jul. 19, 2024, 2 pages.

Decision to Grant, JP App. No. 2023-109114, Feb. 4, 2025, 04 pages of Original Document only.

\* cited by examiner

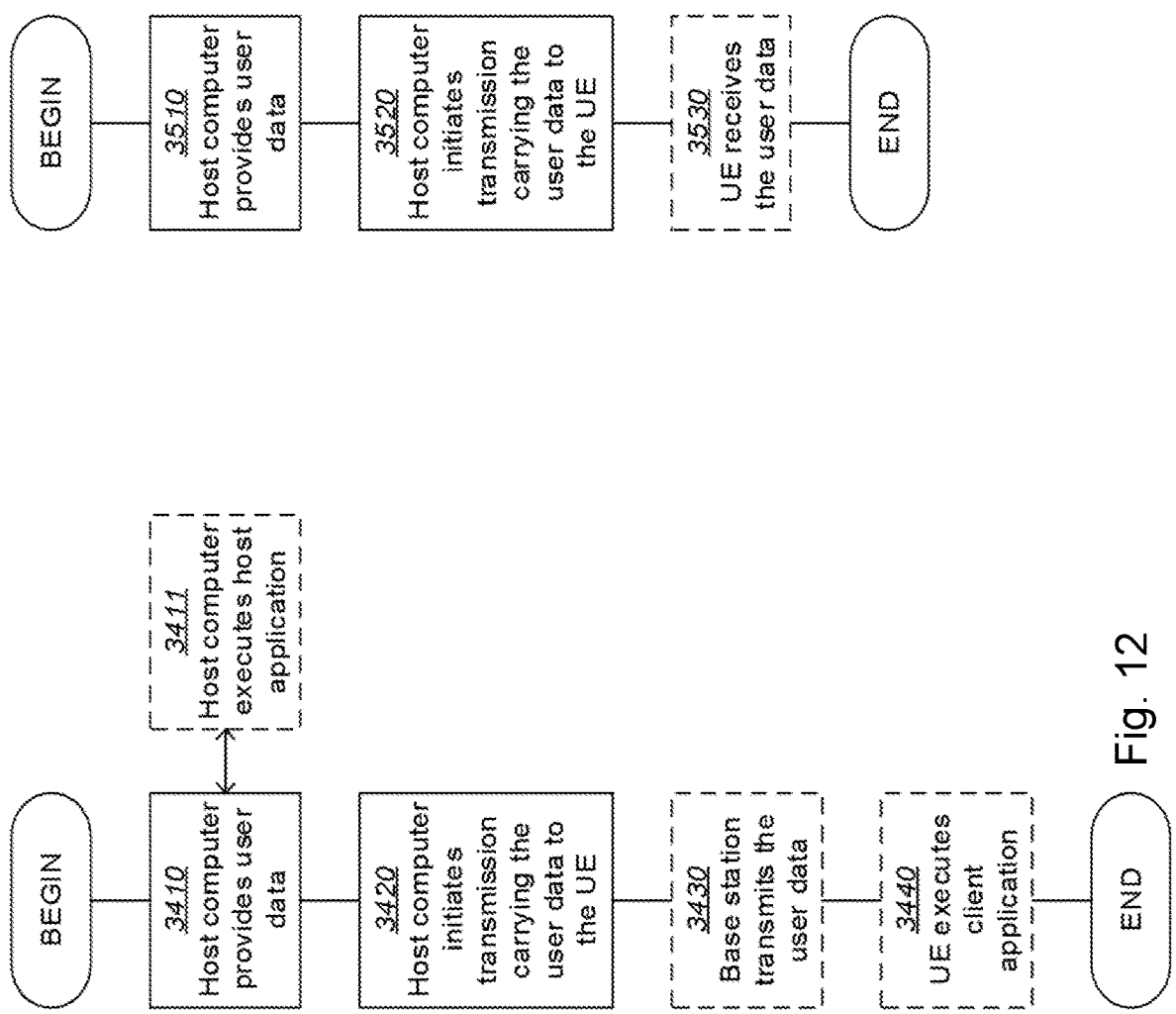

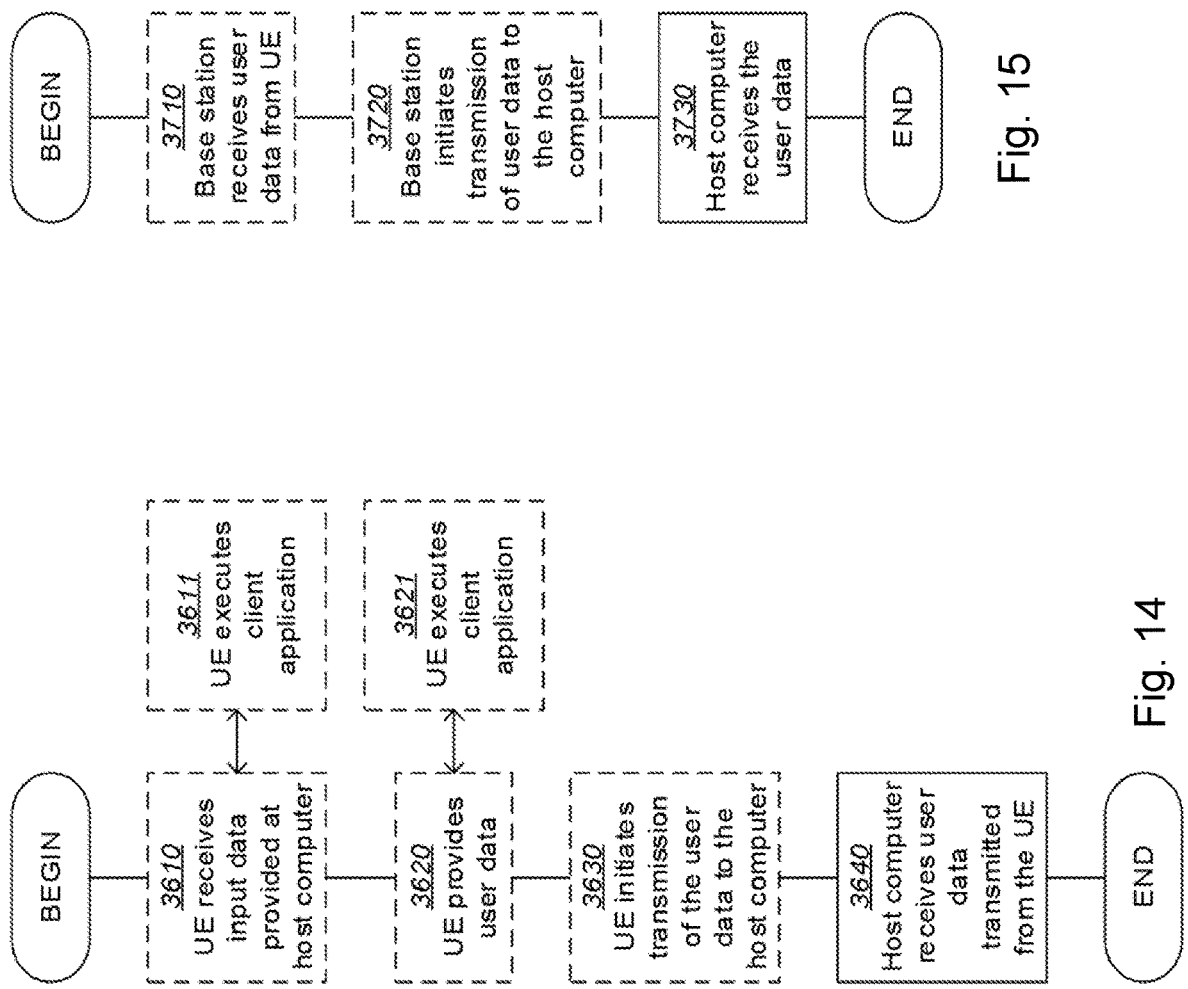

NETWORK NODE, VEHICLE TO EVERYTHING WIRELESS DEVICE AND METHODS PERFORMED THEREIN

CROSS-REFERENCE TO RELATED APPLICATIONS

This application is a National stage of International Application No. PCT/SE2019/051338, filed Dec. 23, 2019, which claims priority to U.S. Application No. 62/846,774, filed May 13, 2019, which are hereby incorporated by reference.

TECHNICAL FIELD

Embodiments herein relate to a network node, a vehicle to everything (V2X) wireless device and methods performed therein. Furthermore, a computer program product and a computer readable storage medium are also provided herein. In particular, embodiments herein relate to enable communication of V2X wireless devices in a wireless communication network.

BACKGROUND

In a typical wireless communication network, wireless devices, also known as wireless communication devices, mobile stations, stations (STA), vehicles with communication capability, and/or user equipments (UE), communicate via a Radio Access Network (RAN) to one or more core networks (CN). The RAN covers a geographical area and provides radio coverage over service areas or cells, which may also be referred to as a beam or a beam group, with each service area or beam being served or controlled by a radio network node such as a radio access node e.g., a Wi-Fi access point or a radio base station (RBS), which in some networks may also be denoted, for example, a NodeB, an eNodeB, or a gNodeB. The radio network node communicates over an air interface operating on radio frequencies with the wireless device within range of the radio network node.

A Universal Mobile Telecommunications network (UMTS) is a third generation (3G) telecommunications network, which is evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted as the X2 interface.

For the 5G system currently being standardized by 3GPP, where the radio access network is referred to as New Radio (NR) and the core network is referred to as Next Generation Core (NGC), 3GPP has agreed to partly change the principles for distribution of system information (SI) that are used in LTE.

During Release 12, the LTE standard has been extended with support of device to device (D2D), specified as "sidelink", features targeting both commercial and Public Safety applications. Some applications enabled by Rel-12 LTE are device discovery, where wireless devices are able to sense the proximity of another wireless device and associated application by broadcasting and detecting discovery messages that carry wireless device and application identities. Another application consists of direct communication based on physical channels terminated directly between wireless devices. In 3GPP, all of these applications are defined under the umbrella of Proximity Services (ProSe).

One of the potential extensions of the ProSe framework consists of support of Vehicle to everything (V2X) communication, which includes any combination of direct communication between vehicles, pedestrians, and infrastructure. V2X communication may take advantage of a Network (NW) infrastructure, when available, but at least basic V2X connectivity should be possible even in case of lack of coverage. Providing an LTE-based V2X interface may be economically advantageous because of the LTE economies of scale and it may enable tighter integration between communications with the NW infrastructure e.g. Vehicle to Infrastructure (V2I) and Vehicle to Pedestrians (V2P) and Vehicle to Vehicle (V2V) communications, as compared to using a dedicated V2X technology.

There are many research projects and field tests of connected vehicles in various countries or regions, including projects that are based on the use of existing cellular infrastructure.

V2X communications may carry both non-safety and safety information, where each of the applications and services may be associated with specific requirements, in terms of e.g. latency, reliability, capacity, etc. From an application point of view, V2X includes the following types of communication/services shown with reference to FIG. 1.

Vehicle to vehicle (V2V): This covers communication between vehicles using V2V applications and is predominantly broadcast-based. V2V may be realized by either direct communication between the devices in the respective vehicles, or via infrastructure such as a cellular network. An example of V2V is the transmission of a cooperative awareness message (CAM) with vehicle status information, such as position, direction, and speed, transmitted to other vehicles in the proximity repeatedly e.g. every 100 ms-1 s. Another example is the transmission of a decentralized environmental notification message (DENM), which is an event-triggered message to alert vehicles. These two examples are taken from the ETSI Intelligent Transport Systems (ITS) specification of V2X applications, which also specifies the conditions under which the messages are generated. Main characteristic of V2V applications is the tight requirements on latency that can vary from 20 ms (for pre-crash warning messages) to 100 ms for other road safety services.

Vehicle to infrastructure (V2I): This comprises communication between vehicles and a Roadside Unit (RSU). The RSU may be a stationary transportation infrastructure entity which communicates with vehicles in its proximity. An example of V2I is transmission of speed notifications from the RSU to vehicles, as well as queue information, collision risk alerts, curve speed warnings. Due to the safety related nature of V2I, delay requirements are similar to V2V requirements.

Vehicle to pedestrian (V2P): This covers communication between vehicles and vulnerable road users, such as pedestrians, using V2P applications. V2P typically takes place between distinct vehicles and pedestrians either directly or via infrastructure such as a cellular network.

Vehicle to network (V2N): This covers communication between a vehicle and a centralized application server (or an Intelligent transportation systems (ITS) Traffic Management Center) both using V2N applications, via infrastructure (such as a cellular network). One example is a bad road condition warning sent to all vehicles in a wide area, or traffic flow optimization in which V2N application suggests speeds to vehicles and coordinates traffic lights. Therefore, V2N messages are supposed to be controlled by a centralized entity, such as a Traffic Management Center, and may be provisioned to vehicles in a large geographical area, rather than in a small area. Additionally, unlike V2V/V2I, latency requirements are more relaxed in V2N because it is not meant to be used for non-safety purposes, e.g. a latency requirement of 1 s is typically considered.

As previously mentioned Sidelink transmissions (also known as D2D or ProSe) over the so-called PC5 interface in cellular spectrum have been standardized in 3GPP since Rel-12. In 3GPP Rel-12 two different transmission modes have been specified in 3GPP. In one mode (mode-1), a UE in RRC_CONNECTED mode requests D2D resources and the eNB grants them via physical downlink control channel (PDCCH) also denoted as DCI5, or via dedicated signalling. In another mode (mode-2), a UE autonomously selects resources for transmission from a pool of available resources that the eNB provides in broadcast via system information block (SIB) signalling for transmissions on carriers other than on a primary cell (PCell) or via dedicated signaling for transmission on the PCell. Therefore, unlike the first operation mode, the second operation mode can be performed also by UEs in RRC_IDLE and in some cases even by UEs out of coverage.

In Rel.14, the usage of sidelink is extended to the V2X domain. The original design of the sidelink physical layer in Rel.12 targeted a scenario with a small number of wireless devices such as UEs competing for the same physical resources in the spectrum, to carry voice packet for Mission Critical Push To Talk (MCPTT) traffic, and assumed low wireless device mobility. On the other hand, in V2X the sidelink should be able to cope with higher load scenario, i.e., hundreds of cars potentially contending for physical resources, to carry time/event triggered V2X messages e.g. Cooperative Awareness Message (CAM) and Decentralized Environmental Notification Message (DENM), and with high wireless device mobility. For such reasons, 3GPP has discussed possible enhancements to the sidelink physical layer.

This disclosure deals with Intelligent transportation system (ITS) and V2X communication from V2X application server and V2X application client to wireless devices referred to as V2X wireless devices using V2X group communication over long-range cellular unicast communication, over radio interface such as LTE Uu.

ITS messages are designed to enable ITS applications improving safety and traffic efficiency of road transport systems. In several V2X applications, e.g. tele-operation, fleet management, group communication is needed for V2X communication from the V2X application server to V2X wireless devices. The group management services shall provide V2X Application Enabler (VAE) support for communication from a V2X wireless device or a V2X application server to a group of V2X wireless devices, to support V2X services, e.g. platooning groups, tele-operation of automated vehicles.

3GPP TS 23.386 [1] defines V2X application layer model for V2X communications over PC5 and LTE-Uu. The model is illustrated in FIG. 2. The V2X application enabler (VAE) layer provide support information to the V2X application.

A V2X UE1 communicates with a V2X application server over a V1 reference point. The V2X UE1 and a V2X UE2 communicate over a V5 reference point. The V2X UE1 can also act as a UE-to-network relay, to enable the V2X UE2 to access the V2X application server over the V1 reference point.

The V2X application layer functional entities for the V2X wireless device and the V2X application server are grouped into the V2X application specific layer and the VAE layer. The VAE layer offers the VAE capabilities to the V2X application specific layer. The V2X application layer functional model utilizes the SEAL services as specified in 3GPP TS 23.434 [2].

The VAE server is located in the VAE layer. The SEAL services utilized by VAE layer are location management, group management, configuration management, identity management, key management and network resource management. The V2X application specific layer consists of the V2X application specific functionalities.

The V2X application server comprises the VAE server, the SEAL servers and the V2X application specific server. The VAE server provides the V2X application layer support functions to the V2X application specific server over Vs reference point.

The V2X UEs comprise the VAE client, the SEAL clients and the V2X application specific client. The VAE client provides the V2X application layer support functions to the V2X application specific client over Vc reference point.

It should be noted that the client and server entities of SEAL can be part of VAE client and VAE server respectively.

The VAE client acts as a VAL client for its interaction with the SEAL clients as specified in 3GPP TS 23.434 [2]. The VAE server may act as a vertical application layer (VAL) server for its interaction with the Service Enabler Architecture Layer for Verticals (SEAL) servers as specified in 3GPP TS 23.434 [2].

In the VAE layer, the VAE client communicates with the VAE server over V1-AE reference point. In the V2X application specific layer, the V2X application specific client communicates with V2X application specific server over V1-APP reference point.

In the VAE layer, the VAE client of the V2X UE2 communicates with the VAE client of the V2X UE1 over V5-AE reference point. In the V2X application specific layer, the V2X application specific client of V2X UE2 communicates with VAE client of V2X UE1 over V5-APP reference point.

The following SEAL services for V2X applications are supported:
   Location management as specified in 3GPP TS 23.434 [2];
   Group management as specified in 3GPP TS 23.434 [2];
   Configuration management as specified in 3GPP TS 23.434 [2];
   Identity management as specified in 3GPP TS 23.434 [2];
   Key management as specified in 3GPP TS 23.434 [2]; and
   Network resource management as specified in 3GPP TS 23.434 [2].

The VAE client interacts with SEAL clients over the SEAL-C reference point specified for each SEAL service. The VAE server interacts with SEAL servers over the SEAL-S reference point specified for each SEAL service. The interaction between the SEAL clients is supported by SEAL-PC5 reference point specified for each SEAL service. The interaction between a SEAL client and the corresponding SEAL server is supported by SEAL-UU reference point specified for each SEAL service.

The SEAL-C, SEAL-S, SEAL-PC5, SEAL-Uu reference points for each SEAL service are specified in 3GPP TS 23.434 [2].

To support distributed VAE server deployments, the VAE server interacts with another VAE server over VAE-E reference point.

V2X UE1 can also act as a UE-to-network relay,
   to enable VAE client on V2X UE2 to access VAE server over V1-AE reference point; and
   to enable V2X application specific client on V2X UE2 to access V2X application specific server over V1-APP reference point.

A V1-AE message can be sent over unicast, transparent multicast via xMB, transparent multicast via MB2. The non-transparent multicast via xMB is triggered by a V1-AE message. Multicast distribution can be supported by both transparent and non-transparent multicast modes.

The VAE server interacts with the 3GPP network system over V2, MB2, xMB, Rx and T8 reference points. The EPS is considered as the 3GPP network system.

SUMMARY

Current procedures in [1] and [2] only describe the group management functions. The delivery of V2X messages to groups over radio interface such as LTE Uu is not specified.

Furthermore, the group management functions in [1] provide support for UE-UE V2X communications: "Group creation support is provided for the V2X applications (e.g. platooning and cooperative short distance grouping) to provide a dedicated group for the V2X UEs to communicate with each other." The group creation request is triggered by a V2X UE and includes identities (ID) of other UEs that are part of the group.

In several V2X applications, e.g. tele-operation and fleet management, group communication is needed for V2X communication from the V2X application server to V2X UEs. The current V2X communication over LTE Uu procedures in [1] address the V2X UEs individually per V2X UE ID instead of as groups via unicast communication.

An object of embodiments herein is to provide a mechanism that improves performance of a wireless communication network, regarding vehicle to everything communication, in an efficient manner.

Embodiments herein describe the procedures and information flows for V2X group communication from a V2X application server (AS) to V2X UEs over e.g. LTE Uu. The procedures include the usage of V2X Group ID for message dissemination and the addressability of V2X UEs via groups for downlink communication over long range LTE Uu. It is herein described usage of the groups for V2X UE to V2X UE communication over e.g. LTE Uu, and/or suggestions how to optimize for V2X group communication. It is herein provided support for V2X group communication from a V2X application server and V2X UE to one or more V2X UEs over radio interface such as LTE Uu.

According to an aspect the object is achieved by providing a method performed by a network node for handling communication of vehicle to everything wireless devices in a wireless communication network. The network node obtains data, such as group ID, relating to a group of wireless devices, and transmits to a V2X wireless device, an announcement message comprising the obtained data. The network node may obtain one or more of the following: data relating and/or describing a service such as service ID; and an indication indicating a geographical area or information for a group e.g. payload for a group ID. The network node may transmit a message, e.g. the announcement message, comprising data such as the group ID, indicating one or more of the obtained data and/or indication.

According to another aspect the object is achieved by providing a method performed by a V2X wireless device for handling a service in a wireless communication network. The V2X wireless device receives an announcement message comprising data, such as group ID, relating to a group of wireless devices. The V2X further transmits to the network node a response to the received announcement message for registering to the group of wireless devices. The announcement message may further comprise: data relating and/or describing a service e.g. service ID; and an indication indicating a geographical area e.g. Geo ID or information for the group.

According to yet another aspect the object is achieved by providing a V2X wireless device for handling a service in a wireless communication network. The V2X wireless device is configured to receive from a network node an announcement message comprising data relating to a group of wireless devices; and to transmit to the network node a response to the received announcement message for registering to the group of wireless devices.

According to still another aspect the object is achieved by providing aa network node network node for handling communication of vehicle to everything wireless devices in a wireless communication network. The network node is configured to obtain data relating to a group of wireless devices; and to transmit to a V2X wireless device, an announcement message comprising the obtained data.

It is furthermore provided herein a computer program product comprising instructions, which, when executed on at least one processor, cause the at least one processor to carry out any of the methods above, as performed by the V2X wireless device or the network node, respectively. It is additionally provided herein a computer-readable storage medium, having stored thereon a computer program product comprising instructions which, when executed on at least one processor, cause the at least one processor to carry out the method according to any of the methods above, as performed by the V2X wireless device or the network node, respectively.

Embodiments herein enable the V2X wireless device to communicate in groups in V2X communication in an efficient manner. This will lead to an improved performance of the wireless communication network regarding vehicle to everything communication.

BRIEF DESCRIPTION OF THE DRAWINGS

Embodiments will now be described in more detail in relation to the enclosed drawings, in which:

FIGS. 12-15 are flowcharts illustrating methods implemented in a communication system including a host computer, a base station and a user equipment.

DETAILED DESCRIPTION

Figure 1:
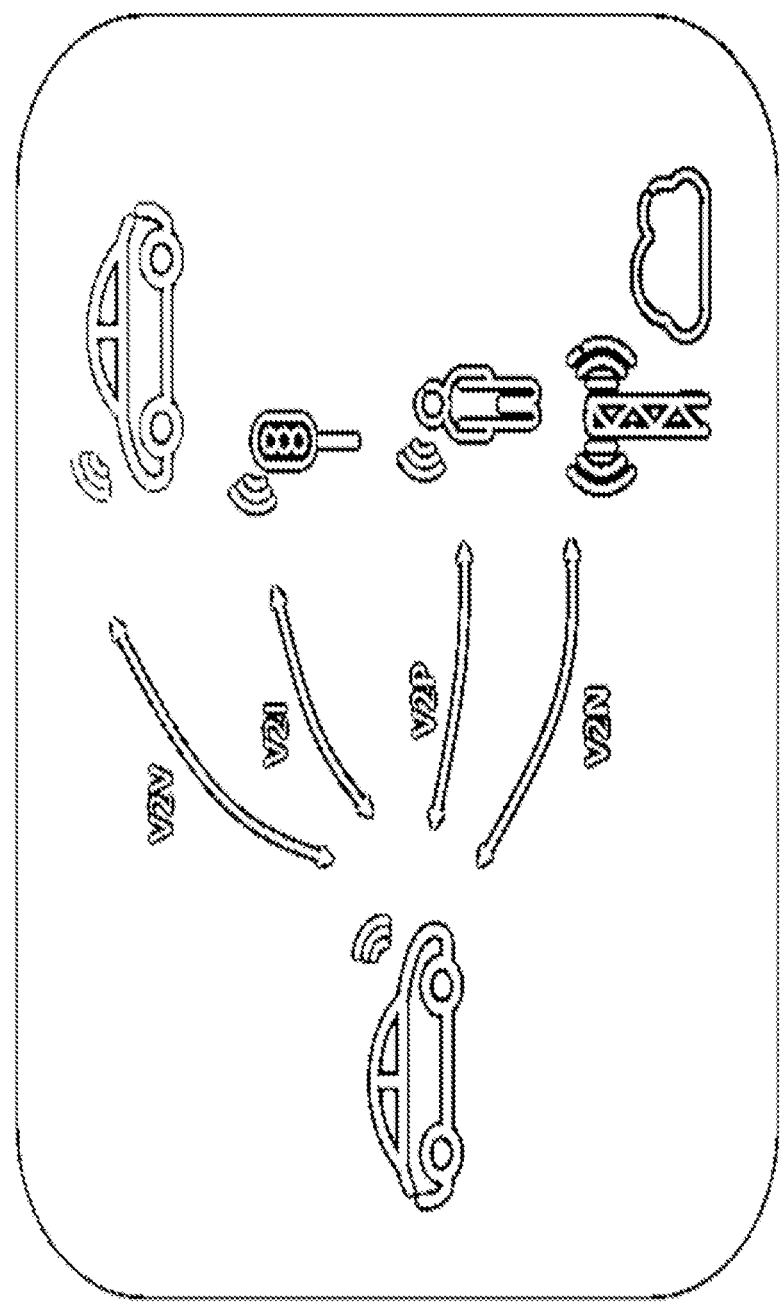
FIG. 1 is a schematic logical overview depicting vehicle communications.
Figure 2:
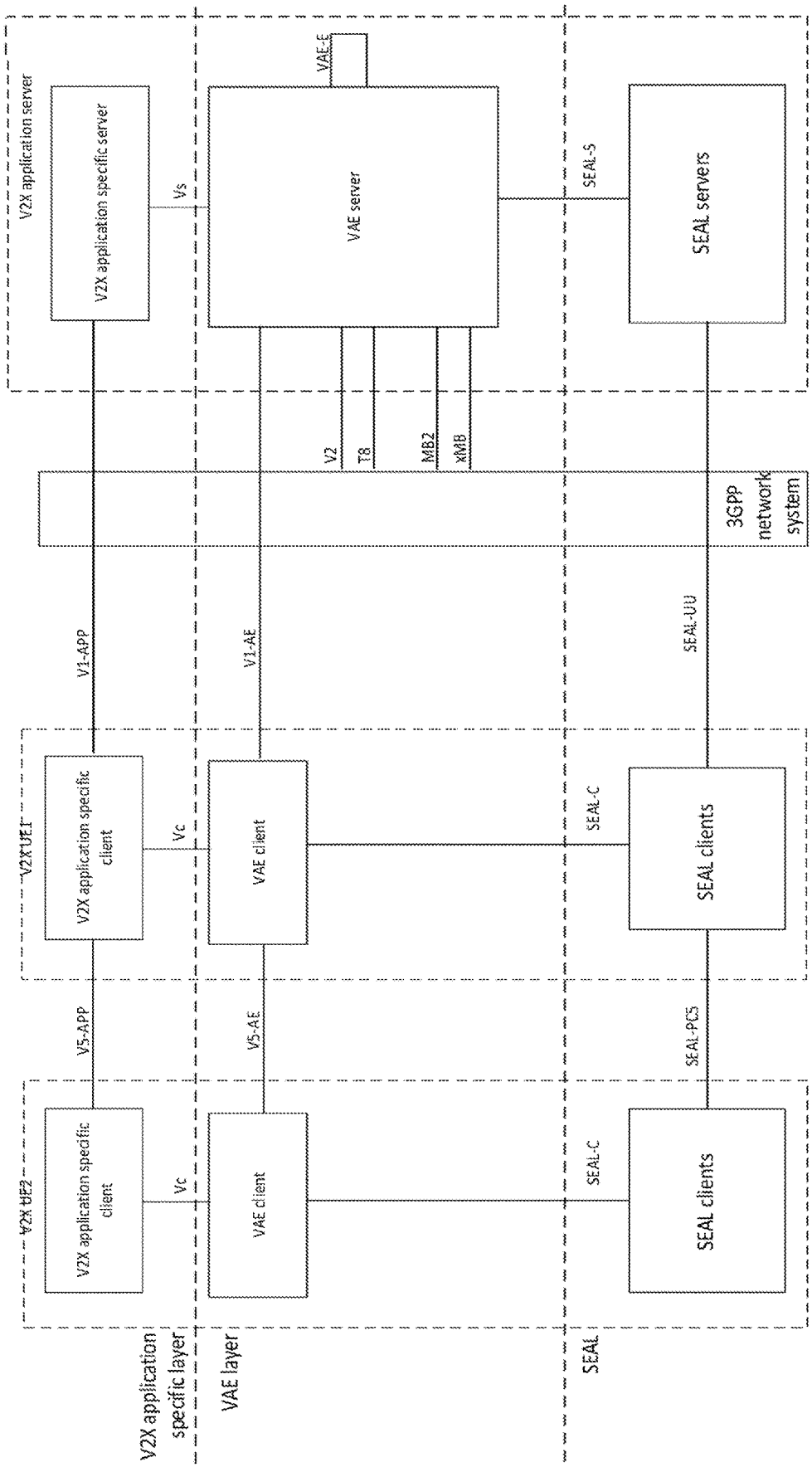
FIG. 2 is a schematic block diagram depicting vehicle communications.
Figure 3:
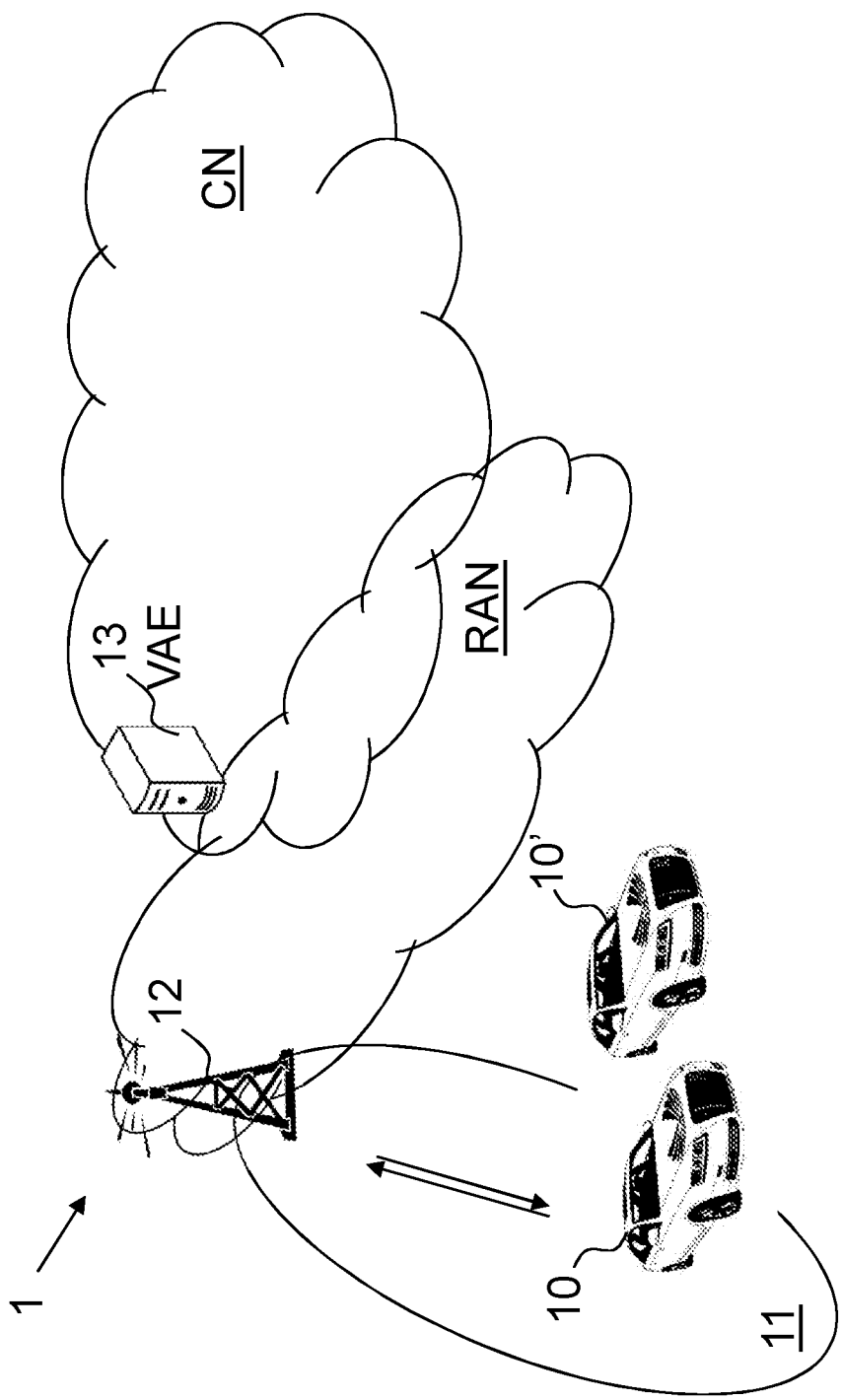
FIG. 3 is a schematic diagram depicting a wireless communication network according to embodiments herein.

Embodiments herein relate to wireless communication networks in general. FIG. 3 is a schematic overview depicting a wireless communication network 1. The wireless communication network 1 comprises one or more RANs and one or more core networks (CNs). The wireless communication network 1 may use one or a number of different technologies, such as New Radio (NR), Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication networks such as e.g. WCDMA and LTE.

In the wireless communication network 1, a V2X wireless device 10 referred to herein also as V2X UE with VAE clients, such as a mobile station, a UE in a vehicle, a vehicle, a non-access point (non-AP) STA, a STA, a user equipment and/or a wireless terminals, may communicate via one or more Access Networks (AN), e.g. a RAN, to one or more core networks (CNs). It should be understood by the skilled in the art that "wireless device" is a non-limiting term which means any terminal, wireless communications terminal, user equipment, internet of things (IoT) capable device, Machine Type Communication (MTC) device, Device to Device (D2D) terminal, or node e.g. smart phone, laptop, mobile phone, sensor, relay, mobile tablets or even a small base station communicating within a service area. Embodiments herein generally relate to the resource management of wireless communication networks with the participation of device-to-device capable UEs, such as Vehicle to Vehicle (V2V) authorized UEs or ProSe authorized UEs. Another V2X wireless device 10' may also be present in the wireless communication network 1.

The wireless communication network 1 comprises a radio network node 12 providing radio coverage over a geographical area referred to as service area 11 or cell, which may be provided by one or more beams or a beam group where the group of beams is covering the service area of a first radio access technology (RAT), such as NR, 5G, LTE, Wi-Fi or similar. A radio network node, such as the radio network node 12, may also serve multiple cells. The radio network node 12 may be a transmission and reception point e.g. a radio-access network node such as a Wireless Local Area Network (WLAN) access point or Access Point Station (AP STA), an access controller, a base station e.g. a radio base station such as a NodeB, an evolved Node B (eNB, eNode B), a gNodeB, a base transceiver station, a radio remote unit, an Access Point Base Station, a base station router, a transmission arrangement of a radio base station, a stand-alone access point or any other network unit capable of communicating with a wireless device within the service area served by the radio network node depending e.g. on the radio access technology and terminology used. The radio network node 12 communicates with the V2X wireless device 10 with Downlink (DL) transmissions to the V2X wireless device 10 and Uplink (UL) transmissions from the V2X wireless device 10 over a radio interface such as a LTE-Uu.

The wireless communication network 1 further comprises a network node 13 such as a VAE server, V2X application server (AS), a V2X server or application server.

According to embodiments herein the V2X wireless device 10 receives from the network node 13 an announcement message comprising data relating to a group of wireless devices, such as group ID. The V2X further transmits to the network node a response to the received announcement message for registering to the group of wireless devices. Embodiments herein enable one or more V2X wireless device such as the V2X wireless device 10 to communicate in groups in an efficient manner. This will lead to an improved performance of the wireless communication network.

Embodiments herein relate to V2X group communication over a radio interface such as LTE Uu.

The VAE capabilities may provide support for V2X group communication from the V2X application server, i.e. the network node 13, to V2X UEs 10-10' over LTE Uu.

Information flows are described herein.

The announcement message may be denoted as a V2X Group Announcement.

Table 1 below describes the information flow for e.g. a VAE server to announce a V2X group to the VAE clients e.g. in V2X wireless devices.

TABLE 1

V2X Group Announcement

| Information element | Status | Description |
|---|---|---|
| V2X Group ID | Mandatory | The group ID to be used for the V2X group. |
| V2X service ID list | Optional | List of V2X services whose service communications are to be enabled on the group. |
| Geo ID list | Optional | List of geographical areas to be addressed by the group. |
| Identity list | Optional | List of V2X UE IDs who are member of the group. |

Embodiments herein may also disclose a procedure when the V2X wireless device requests to register to the group. I.e. when the V2X wireless device 10 transmits to the network node 13 a request denoted as a V2X Group Registration Request.

Table 2 describes the information flow for a VAE client of a V2X wireless device to register for the V2X group in response to a V2X group announcement from the VAE server.

TABLE 2

V2X Group Registration Request

| Information element | Status | Description |
|---|---|---|
| V2X UE ID | Mandatory | Identity of the V2X UE registering to the V2X group. |
| V2X Group ID | Mandatory | The group ID to be registered by the V2X UE for the V2X group. |

Embodiments herein may also disclose a procedure when the network node such as a VAE server responds to the request to register to the group. I.e. when the network node 13 responds back to the V2X wireless device 10 with a response denoted as a V2X Group Registration Response.

Table 3 describes the information flow for a VAE server to respond for group registration request from the VAE client.

TABLE 3

V2X Group Registration Response

| Information element | Status | Description |
|---|---|---|
| Result | Optional | Result from the VAE server in response to V2X group registration request indicating success or failure |

Embodiments herein may also disclose a procedure when the network node such as the VAE server transmits data to the group. I.e. when the network node 13 transmits to the group of wireless devices data in a message denoted as a V2X Group Message.

Table 4 describes the information flow for a VAE server to deliver V2X message to a group of VAE clients.

TABLE 4

V2X Group Message

| Information element | Status | Description |
|---|---|---|
| V2X Group ID | Mandatory | The group ID to be used for the V2X group. |
| V2X Message | Mandatory | V2X message payload (e.g. ETSI ITS DENM [X]) |
| V2X service ID | Optional | V2X service ID, the V2X UE is interested in receiving (e.g. PSID or ITS AID of ETSI ITS DENM, ETSI ITS CAM) |
| Geo ID | Optional | Geographical area identifier (e.g. subscription URI, tile identifier, geo-fence tile identifier) |

V2X Group Establishment

This subclause describes the procedures for establishing V2X group communication from the VAE server to the VAE clients, i.e. from the network node 13 to the V2X wireless devices 10 sand 10'.

Figure 4:
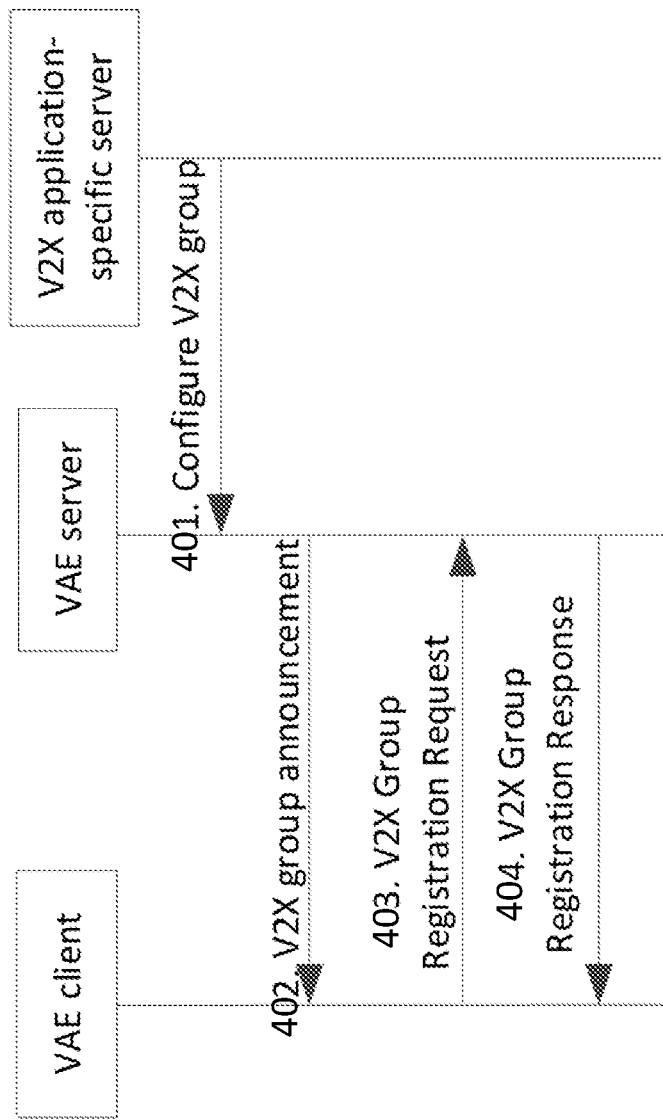
FIG. 4 is a combined flowchart and signalling scheme according to some embodiments herein.

FIG. 4 shows an exemplified procedure for establishing V2X group communication between the VAE server and VAE client Pre-Conditions:

The VAE client may have discovered the VAE server as described in subclause 9.1.2 in [1].

401. The V2X application-specific server configures V2X group for LTE Uu communication defined by V2X Group ID for one or more V2X services with list of V2X Service ID with the VAE server such as the network node 13.

402. The VAE server, being an example of the network node 13, announces the V2X Group to the VAE clients such as the V2x-UEs 10, 10'.

403. The VAE client of the V2X wireless device registers to V2X group communication using the V2X Group ID.

404. The VAE server may send a V2X group communication response to the VAE client.

V2X Group Message Distribution

This subclause describes the procedures for V2X group delivery from the network node 13 such as the VAE server to the V2X wireless devices such as the VAE clients.

Figure 5:
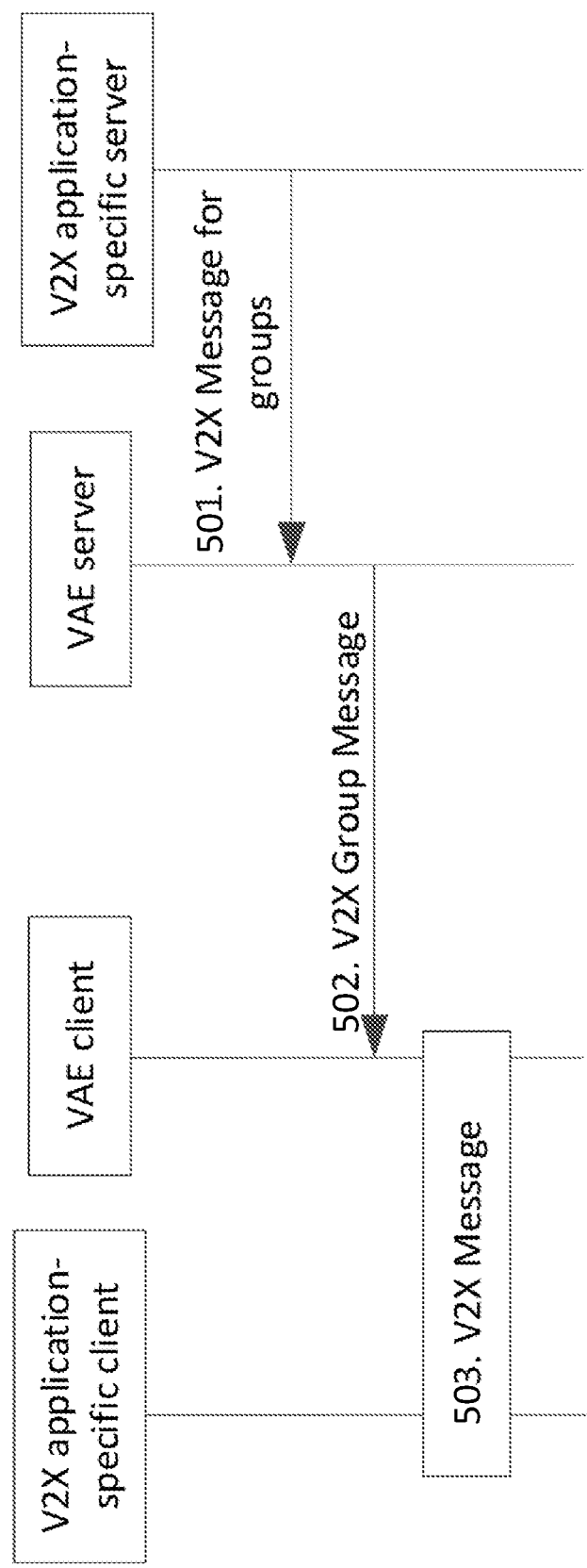
FIG. 5 is a combined flowchart and signalling scheme according to some embodiments herein.

FIG. 5 shows an exemplified procedure for delivering V2X group messages to VAE clients Pre-Conditions:

The VAE client may have registered for receiving V2X group messages as described in [1].

501. The V2X application-specific server provides a V2X message for distribution to V2X group with V2X Group ID.

502. The VAE server delivers the V2X message to all registered VAE clients with V2X Group ID.

503. The VAE client provides the V2X message to the V2X application-specific client.

V2X Group Communication for UE to UE Over LTE-Uu

The V2X UE might utilize the group to deliver V2X messages to other V2X UEs within the group via LTE Uu.

The V2X UE delivers uplink messages to the V2X application specific-server using Group ID.

Figure 6:
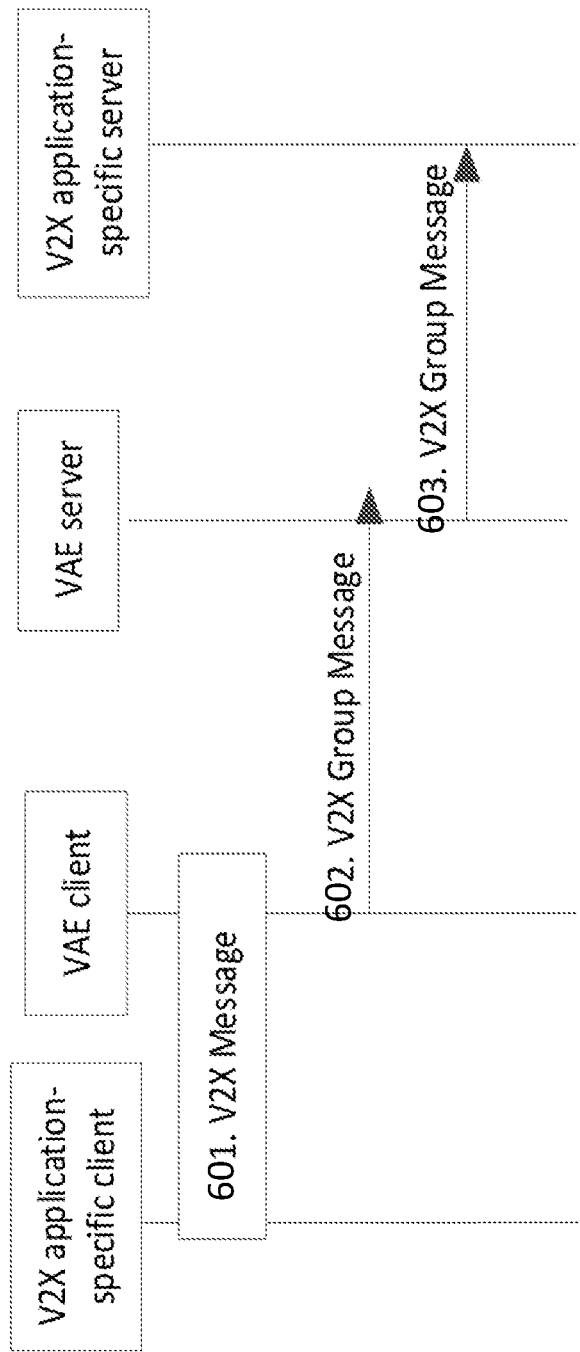
FIG. 6 is a combined flowchart and signalling scheme according to some embodiments herein.

FIG. 6 shows an exemplified procedure for delivering V2X group messages to V2X AS.

601. The V2X application-specific clients provides a V2X message for distribution to the VAE client.

602. The VAE client delivers the V2X message to VAE server using V2X Group ID.

603. The VAE server provides the V2X message to the V2X application-specific server.

The V2X application-specific server delivers the messages to the other V2X UEs in the group via procedure in FIG. 5.

Note: Group ID can be used for the destination address of both uplink and downlink communication.

Note: an authentication mechanism for control the permission of V2X application server (downlink) or V2X application client (uplink) to send message to the Group might be needed.

Optimizations

- A same message, e.g. road hazard warning, may be sent to different groups of UEs using different settings, e.g. quality of service (QoS) requirements. The network node 13 such as a VAE server may organize the group depending on the position and status of vehicles. The network node 13 may have network knowledge and may construct different groups for same V2X service or set of V2X services depending on QoS requirement.
- The network node 13 may have a limit on the size of the group, so the result is failure if the maximum size of the group is reached.
- The announcement message may be sent to all UEs in the whole network or using cellular broadcast or may include an identity list of receivers.
- The announcement message may be announced at any time to inform the UEs about updates to the group.
- The announcement message may be triggered by the V2X wireless device 10 (e.g. UE requests to form a group).
- The V2X wireless device registration may go to a configuration management server within the V2X AS and may be initiated by a configuration management client with the V2X wireless device.
- The group can be addressed for a single V2X wireless device who is interested in receiving multiple services that belong to a group.
- The group may include some services that correspond to one geographical area and others that correspond to another geographical area.
- The uplink V2X message may go to the network node 13 without being forwarded to the V2X application-specific server.

Figure 7A:
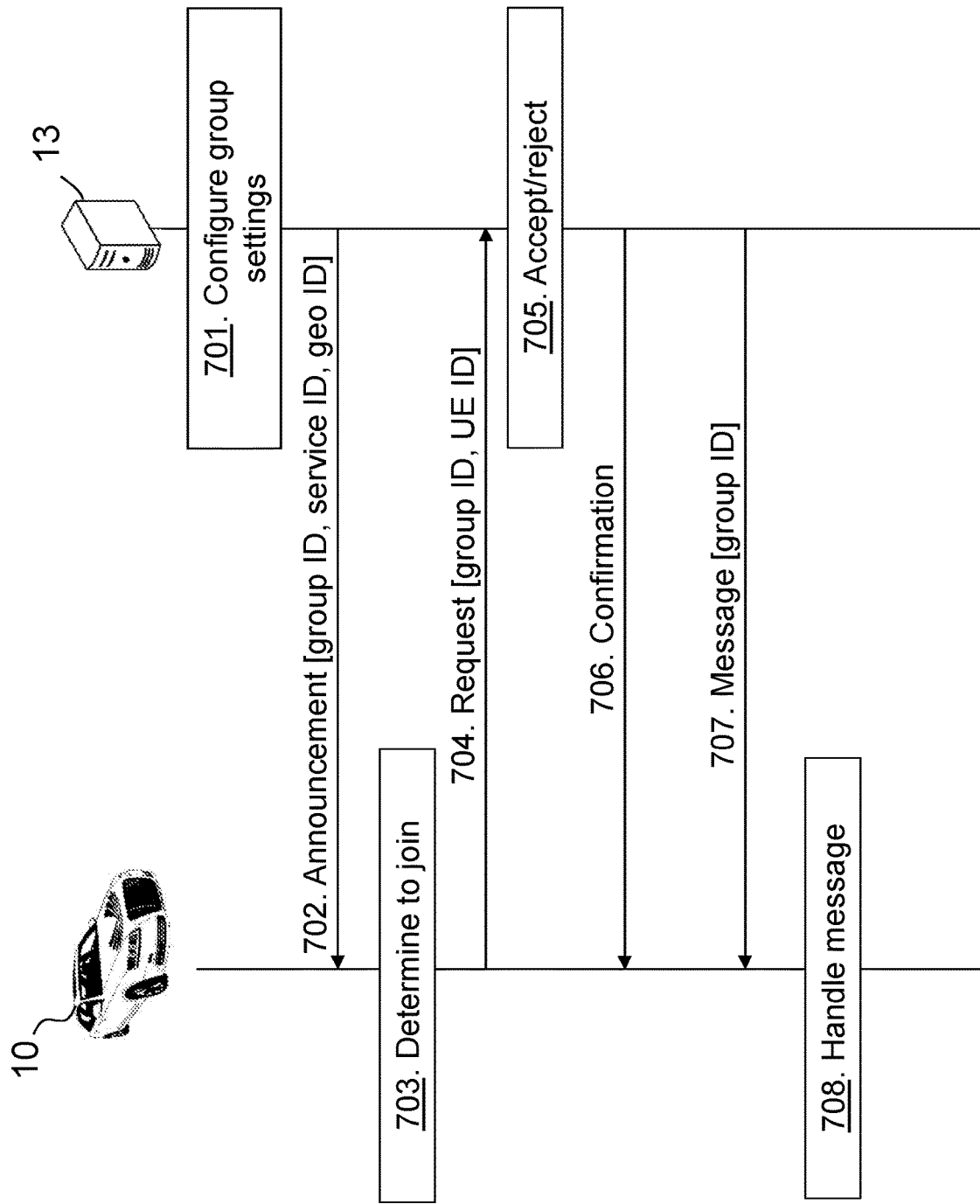
FIG. 7a is a combined flowchart and signalling scheme according to some embodiments herein.

FIG. 7a is a combined flowchart and signaling scheme according to some embodiments herein.

Action 701. The network node 13 may obtain configuration for a group of wireless devices for a service. The configuration may comprise one or more of the following: data relating to the group of wireless devices; data relating to and/or describing a service; and an indication indicating a geographical area or information for the group.

Action 702. The network node 13 then transmits the announcement message for announcing the service for group usage. The message comprises the data indicating the group e.g. group ID and may comprise one or more of the following: the data relating to and/or describing a service; and the indication indicating a geographical area or information for a group.

Action 703. The V2X wireless device 10 may then upon reception of the announcement message determine whether to join the service (group service). E.g. based on received data and/or location, e.g. wants to join fastest-route group.

Action 704. The V2X wireless device 10 may then transmit a request to the network node 13 or towards the network node 13 to join the group indicating the group ID and/or the service ID, e.g. may transmit a group registration request.

Action 705. The network node 13 may then accept or reject request to join based on load, location and/or similar.

Action 706. The network node 13 may then respond to the group registration request from the V2X wireless device 10.

Action 707. The network node 13 may then transmit a message such as a V2X message to the group of wireless devices. The message may comprise group ID and/or message payload.

Action 708. The V2X wireless device 10 then handles the message based on the group ID and/or service ID. E.g. read and display information and/or forward the message to other UEs etc.

It is herein described the procedures and information flows for V2X group communication from the V2X application server and the V2X wireless device 10 to V2X wireless devices over radio interface such as LTE Uu. Optimizations are mentioned for V2X group communication over LTE Uu.

Figure 7B:
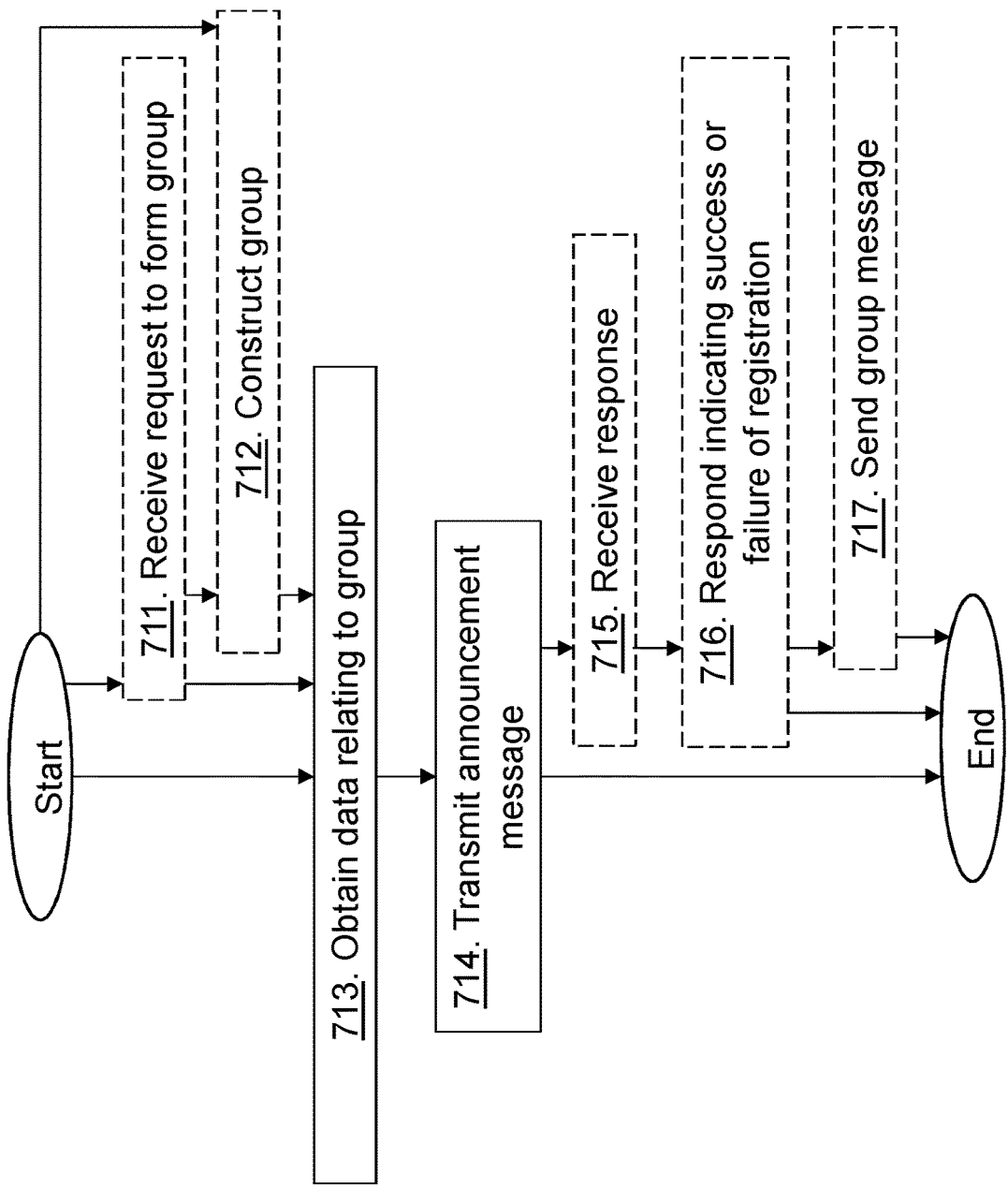
FIG. 7b is a schematic block diagram depicting a method performed by a network node according to embodiments herein.
Figure 7C:
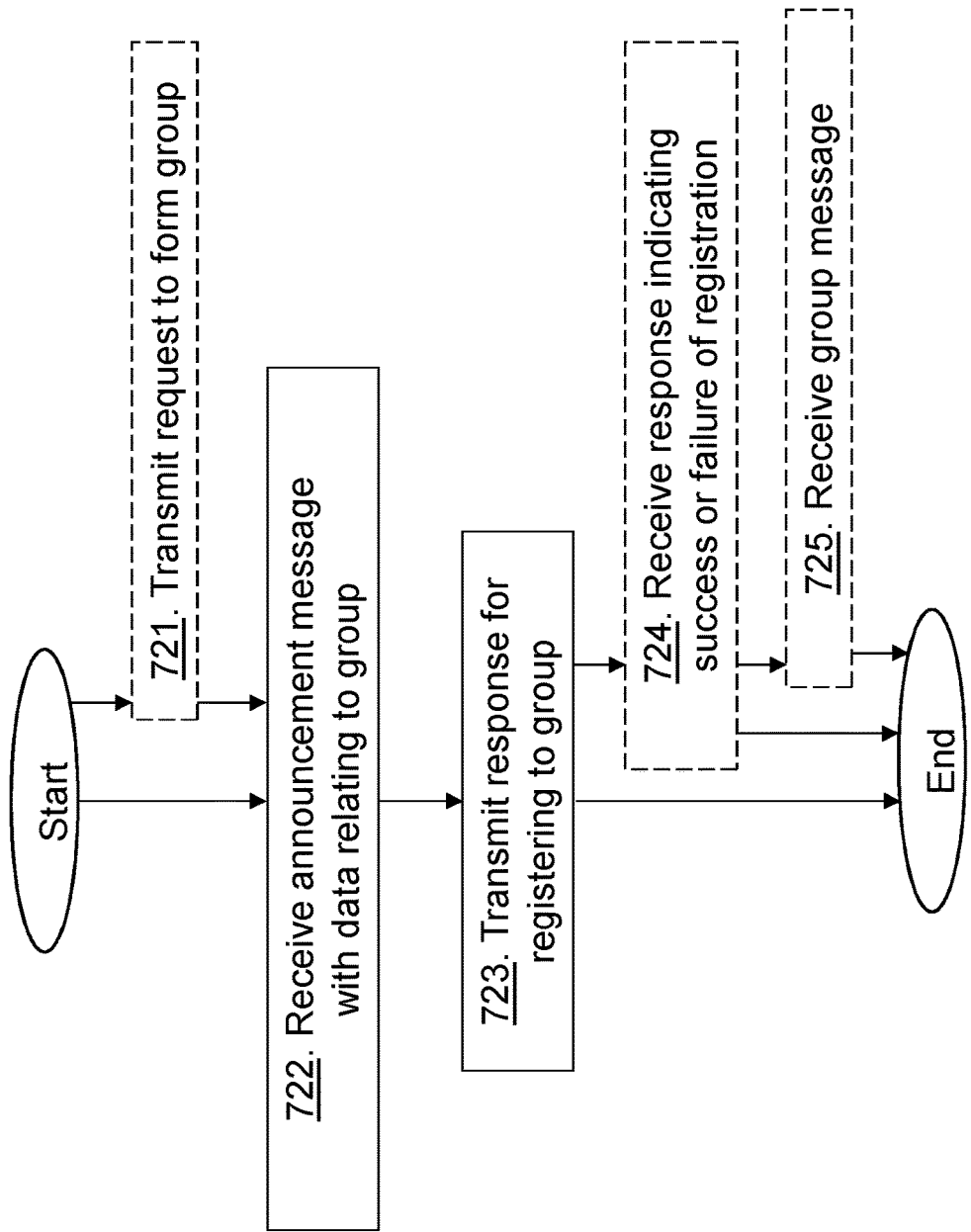
FIG. 7c is a schematic block diagram depicting a method performed by a V2X wireless device according to embodiments herein.

The method actions performed by the network node 13 for handling communication of vehicle to everything wireless devices in a wireless communication network according to embodiments herein will now be described with reference to a flowchart depicted in FIG. 7b. The actions do not have to be taken in the order stated below, but may be taken in any suitable order. Actions performed in some embodiments are marked with dashed boxes. The network node may be a group management server and/or an application server.

Action 711. The network node 13 may receive a request from the V2X wireless device 10 to form the group.

Action 712. The network node 13 may construct the group of wireless devices based on the data describing the service, the indication indicating a geographical area and/or the information for the group and wherein the data relating to the group comprises a group identity of the group. The group may have a maximum size. The group may include different services that correspond to different geographical areas.

Action 713. The network node 13 obtains data relating to the group of wireless devices, e.g. group ID or data for a group ID. The obtained data may further comprise data describing the service; and/or an indication indicating a geographical area or information for the group.

Action 714. The network node 13 further transmits to the V2X wireless device, the announcement message comprising the obtained data. The announcement message may be transmitted to at least one V2X wireless device by means of cellular unicast or broadcast. The transmission of announcement message may be triggered by an initial request from the V2X wireless device to form the group, see action 711.

Action 715. The network node 13 may further receive a response to the transmitted announcement message from the V2X wireless device for registering to the group of wireless devices.

Action 716. The network node 13 may respond with a response indicating success or failure of registration of the V2X wireless device.

Action 717. The network node 13 may send a group message to the registered V2X wireless device, wherein the group message comprises the group ID which is the data related to the group of wireless devices.

The method actions performed by the V2X wireless device 10 for handling a service in the wireless communication network according to embodiments herein will now be described with reference to a flowchart depicted in FIG. 7b. The actions do not have to be taken in the order stated below, but may be taken in any suitable order. Actions performed in some embodiments are marked with dashed boxes. The network node may be a group management server and/or an application server.

Action 721. The V2X wireless device 10 may transmit the request to form a group of wireless devices.

Action 722. The V2X wireless device 10 receives from the network node 13 the announcement message comprising data, such as group ID, relating to the group of wireless devices. The group may have a maximum size. The group may include different services that correspond to different geographical areas. The announcement message may further comprise: data describing a service, an indication indicating a geographical area, and/or information for a group.

Action 723. The V2X wireless device 10 further transmits to the network node 13 the response to the received announcement message for registering to the group of wireless devices.

Action 724. The V2X wireless device 10 may receive the response indicating success or failure of registration to the group.

Action 725. The V2X wireless device 10 may receive the group message from the network node 13, wherein the group message comprises the group ID which is the data related to the group of wireless devices.

Figure 8:
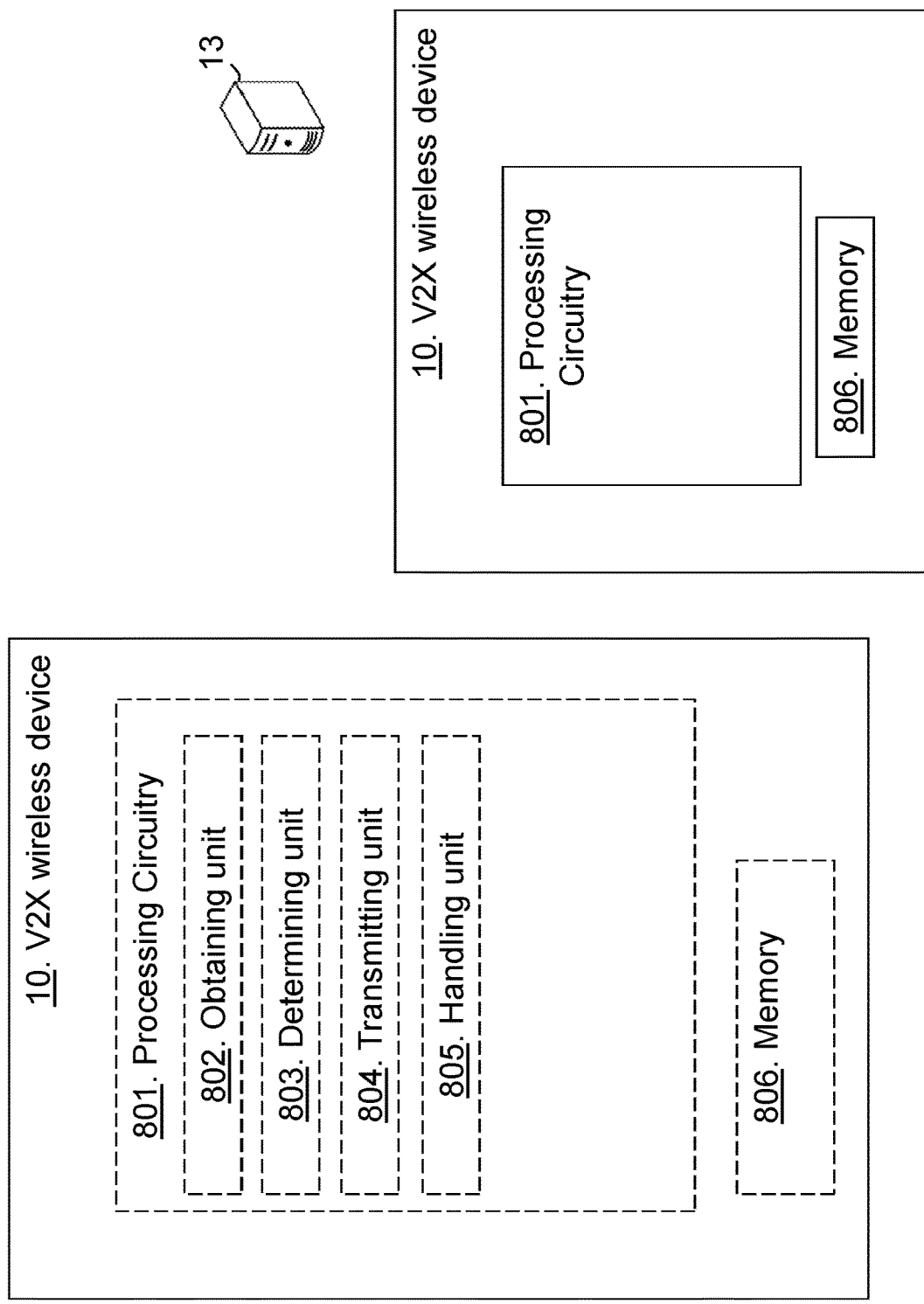
FIG. 8 is a schematic block diagram depicting a V2X wireless device according to embodiments herein.

FIG. 8 is a schematic block diagram depicting the V2X wireless device 10 for handling a service in the wireless communication network.

The V2X wireless device 10 may comprise processing circuitry 801, e.g. one or more processors, configured to perform the methods herein.

The V2X wireless device 10 may comprise an obtaining unit 802, such as a receiver or transceiver. The V2X wireless device 10, the processing circuitry 801, and/or the obtaining unit 802 is configured to receive from the network node 13 the announcement message comprising data relating to the group of wireless devices. The V2X wireless device 10, the processing circuitry 801, and/or the obtaining unit 802 may be configured, from the radio network node 12 or be pre-configured, to obtain the message for announcing the service for group usage. The announcement message may further comprise data describing the service, the indication indicating a geographical area, and/or information for the group. The message may thus comprise the data indicating the group e.g. group ID and may comprise one or more of the following: the data relating to and/or describing a service; and the indication indicating a geographical area or information for a group.

The V2X wireless device 10 may comprise a determining unit 803. The V2X wireless device 10, the processing circuitry 801, and/or the determining unit 803 may be configured to determine upon reception of the announcement message, whether to join the service (group service). E.g. based on received data and/or location, want to join fastest-route group.

The V2X wireless device 10 may comprise a transmitting unit 804, e.g. transmitter or transceiver. The V2X wireless device 10, the processing circuitry 801, and/or the transmitting unit 804 is configured to transmit to the network node the response to the received announcement message for registering to the group of wireless devices. The V2X wireless device 10, the processing circuitry 801, and/or the transmitting unit 804 may be configured to transmit the request to the network node 13 indicating the group ID and/or the service ID, e.g. a group registration request. The V2X wireless device 10, the processing circuitry 801, and/or the transmitting unit 804 may be configured transmit the request to form the group of wireless devices. The group may have a maximum size.

The V2X wireless device 10, the processing circuitry 801, and/or the obtaining unit 802 may be configured receive the response indicating success or failure of registration to the group. The group may include different services that correspond to different geographical areas.

The V2X wireless device 10, the processing circuitry 801, and/or the obtaining unit 802 may be configured receive a group message from the network node (13), wherein the group message comprises a group ID which is the data related to the group of wireless devices. The V2X wireless device 10, the processing circuitry 801, and/or the obtaining unit 802 may be configured receive the message such as a V2X message to a group a wireless devices. The message may comprise group ID and/or message payload.

The V2X wireless device 10 may comprise a handling unit 805. The V2X wireless device 10, the processing circuitry 801, and/or the handling unit 805 may be configured to handle the message based on the group ID and/or service ID. E.g. read and display information and/or forward the message to other UEs etc.

The V2X wireless device 10 further comprises a memory 806 comprising one or more memory units. The memory 806 comprises instructions executable by the processing circuitry 801 to perform the methods herein when being executed in the V2X wireless device 10. The memory 806 is arranged to be used to store e.g. information, data such as sets of group IDs, service IDs, UE IDs, GEO IDs, conditions, locations, speed, category, etc.

The methods according to the embodiments described herein for the V2X wireless device 10 are respectively implemented by means of e.g. a computer program 807 or a computer program product 807, comprising instructions, i.e., software code portions, which, when executed on at least one processor, cause the at least one processor to carry out the actions described herein, as performed by the V2X wireless device 10. The computer program product 807 may be stored on a computer-readable storage medium 808, e.g. a disc, a universal serial bus (USB) stick or similar. The computer-readable storage medium 808, having stored thereon the computer program product 807, may comprise the instructions which, when executed on at least one processor, cause the at least one processor to carry out the actions described herein, as performed by the V2X wireless device 10. In some embodiments, the computer-readable storage medium 808 may be a transitory or non-transitory computer-readable storage medium. Thus, the V2X wireless device 10 may comprise the processing circuitry 801 and the memory 806, said memory 806 comprising instructions executable by said processing circuitry 801 whereby said V2X wireless device 10 is operative to perform the methods herein.

Figure 9:
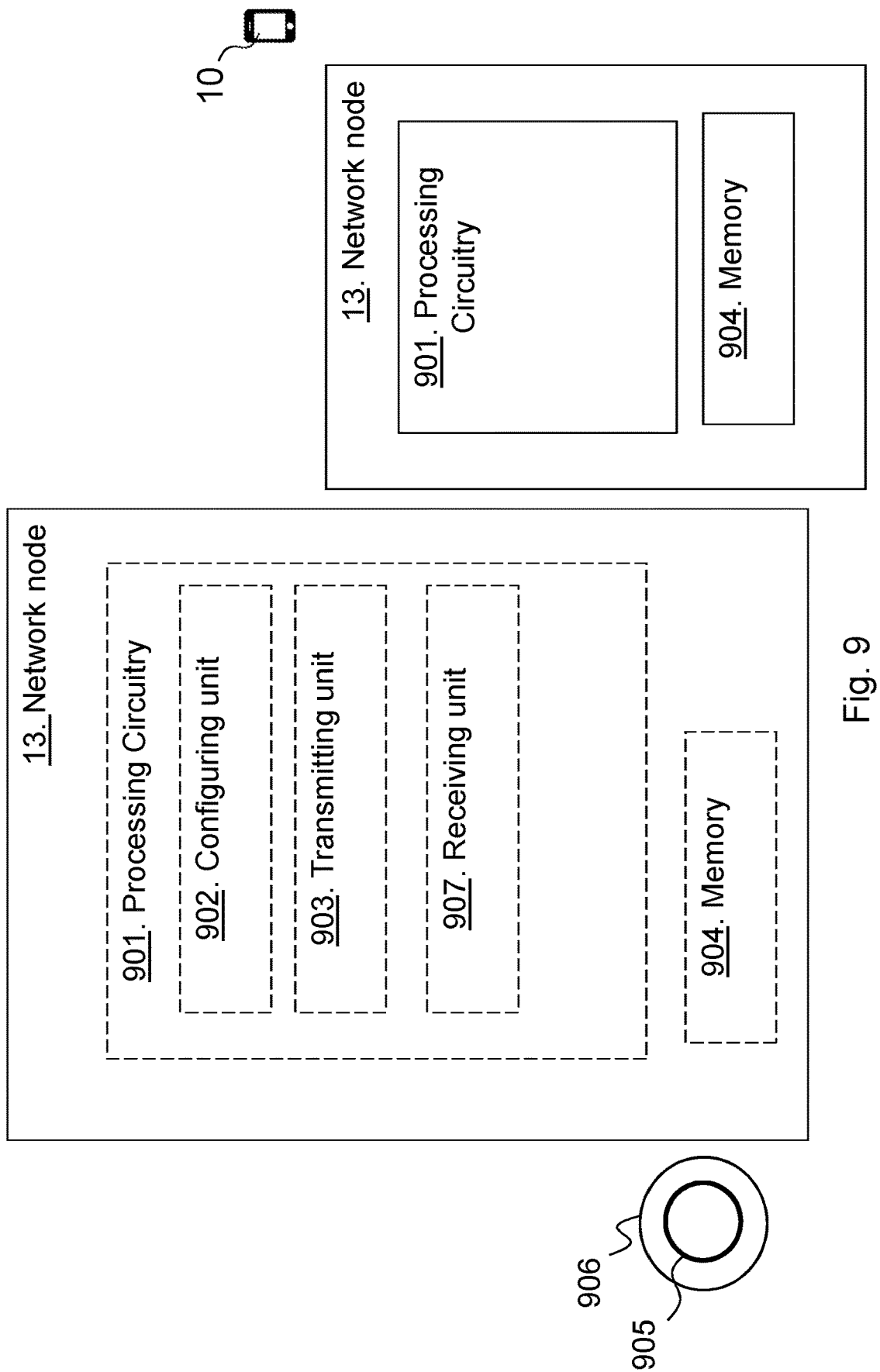
FIG. 9 is a schematic block diagram depicting a network node according to embodiments herein.

FIG. 9 is a schematic block diagram depicting the network node 13 for handling communication of vehicle to everything wireless devices in the wireless communication network e.g. for enabling communication for the wireless device 10 in the wireless communication network 1. The network node may be a VAE server, a group management server and/or an application server.

The network node 13 may comprise a processing circuitry 901, e.g. one or more processors, configured to perform the methods herein.

The network node 13 may comprise a configuring unit 902. The network node 13, the processing circuitry 901, and/or the configuring unit 902 may be configured to obtain configuration for a group of wireless devices 10 for a service. The configuration may comprise one or more of the following: data relating to a group of wireless devices; data relating to and/or describing a service; and an indication indicating a geographical area or information for a group. The network node 13, the processing circuitry 901, and/or the configuring unit 902 is configured to obtain data relating to the group of wireless devices. The obtained data may further comprise data describing the service. The obtained data may further comprise the indication indicating the geographical area or information for the group. The network node 13, the processing circuitry 901, and/or the configuring unit 902 may be configured to construct the group of wireless devices based on the data describing the service, the indication indicating a geographical area and/or the information for the group and wherein the data relating to the group comprises a group identity of the group. The group may have a maximum size. The group may include different services that correspond to different geographical areas.

The network node 13 may comprise a transmitting unit 903, e.g. a transmitter or a transceiver. The network node 13, the processing circuitry 901, and/or the transmitting unit 903 is configured to transmit to the V2X wireless device, the announcement message comprising the obtained data. E.g. to transmit the message for announcing the service for group usage. The network node 13, the processing circuitry 901, and/or the transmitting unit 903 may be configured to transmit the announcement message to the vehicle to everything wireless device by means of cellular unicast or broadcast. The message comprises the data indicating the group e.g. group ID and may comprise one or more of the following: the data relating to and/or describing a service; and the indication indicating a geographical area or information for a group. The transmission of the announcement message may be triggered by an initial request from the vehicle to everything wireless device to form a group.

The network node 13 may comprise a receiving unit 907, e.g. a receiver or a transceiver. The network node 13, the processing circuitry 901, and/or the receiving unit 907 may be configured to receive the response to the transmitted announcement message from the V2X wireless device for registering to the group of wireless devices. E.g. receive a request from the V2X wireless device 10 indicating the group ID and/or the service ID, e.g. a group registration request.

The network node 13, the processing circuitry 901, and/or the transmitting unit 903 may be configured to respond with the response indicating success or failure of registration of the V2X wireless device, e.g. respond to the group registration request from the wireless device 10. The network node 13, the processing circuitry 901, and/or the transmitting unit 903 may be configured to send a group message to the registered vehicle to everything wireless device, wherein the group message comprises a group ID which is the data related to the group of wireless devices, e.g. transmit a message such as a V2X message to a group of wireless devices. The message may comprise group ID and/or message payload.

The network node 13 further comprises a memory 904 comprising one or more memory units. The memory 904 comprises instructions executable by the processing circuitry 901 to perform the methods herein when being executed in the network node 13. The memory 904 is arranged to be used to store e.g. information, data such as configurations, service IDs, locations, group IDs, etc.

The methods according to the embodiments described herein for the network node 13 are respectively implemented by means of e.g. a computer program 905 or a computer program product 905, comprising instructions, i.e., software code portions, which, when executed on at least one processor, cause the at least one processor to carry out the actions described herein, as performed by the network node 13. The computer program product 905 may be stored on a computer-readable storage medium 906, e.g. a disc, a USB stick, or similar. The computer-readable storage medium 906, having stored thereon the computer program product 905, may comprise the instructions which, when executed on at least one processor, cause the at least one processor to carry out the actions described herein, as performed by the network node 13. In some embodiments, the computer-readable storage medium may be a transitory or a non-transitory computer-readable storage medium. Thus, the network node 13 may comprise the processing circuitry 901 and the memory 904, said memory 904 comprising instructions executable by said processing circuitry 901 whereby said network node 13 is operative to perform the methods herein.

As will be readily understood by those familiar with communications design, means, units or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

Figure 10:
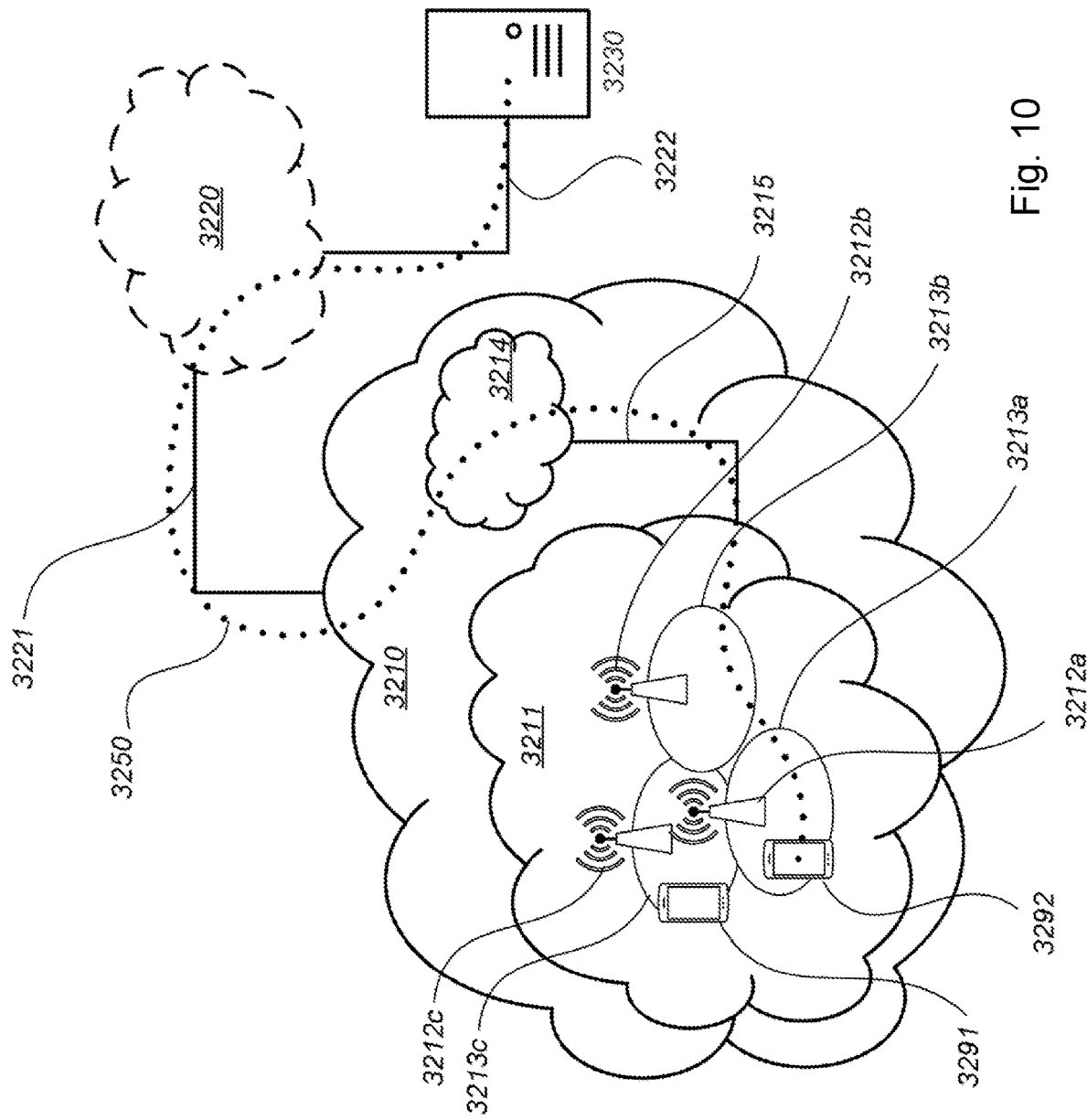
FIG. 10 schematically illustrates a telecommunication network connected via an intermediate network to a host computer.

With reference to FIG. 10, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points being examples of the radio network node 12 herein, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291, being an example of the wireless device 10, located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 11:
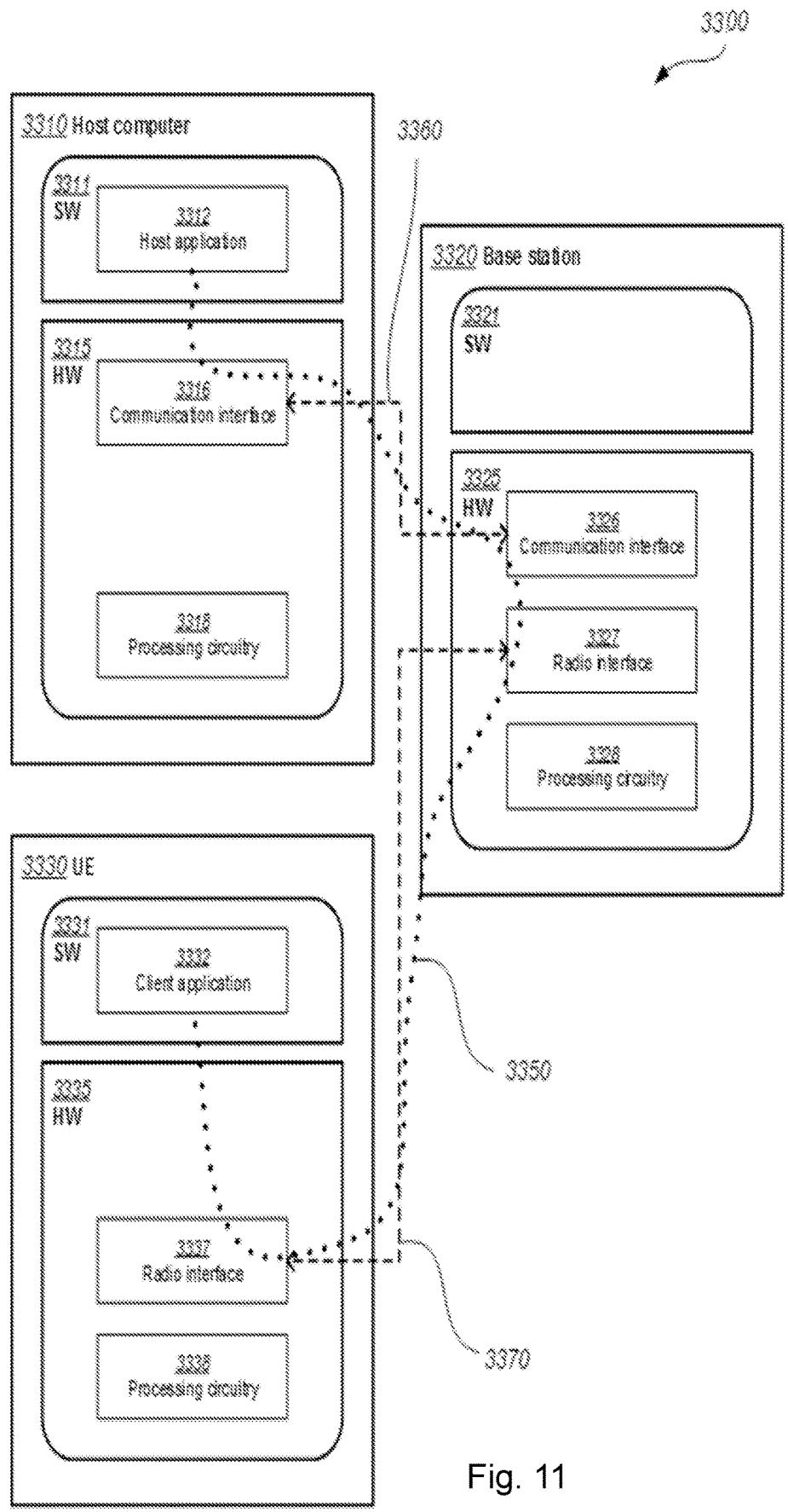
FIG. 11 is a generalized block diagram of a host computer communicating via a base station with a user equipment over a partially wireless connection.

It is noted that the host computer 3310, base station 3320 and UE 3330 illustrated in FIG. 11 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

In FIG. 11, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the latency by enabling the group communication in the wireless communication network and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

REFERENCES

[1] 3GPP TS 23.286, Application layer support for V2X services; Functional architecture and information flows, V1.1.0, 04-2019.
[2] 3GPP TS 23.434, Service Enabler Architecture Layer for Verticals; Functional architecture and information flows, V1.1.0, 04-2019.

Abbreviations

V2X AS V2X application server
VAE V2X Application Enabler

V2X UE User equipment
ITS Intelligent Transport Systems
ITS-S ITS Station
V2X Vehicle to everything

ANNEX

1. Introduction

The group management services shall provide VAE support for communication from a V2X UE or a V2X application server to a group of V2X UEs, to support V2X services, e.g. platooning groups, tele-operation of automated vehicles.
The group management functions in Section 9.1 provide support for UE-UE V2X communications:
"Group creation support is provided for the V2X applications (e.g. platooning and cooperative short distance grouping) to provide a dedicated group for the V2X UEs to communicate with each other." The group creation request is triggered by a V2X UE and includes IDs of other UEs that are part of the group.
In several V2X applications, e.g. tele-operation, fleet management, group communication is needed for V2X communication from the V2X application server to V2X UEs. The current V2X communication over LTE Uu procedures address the V2X UEs individually per V2X UE ID instead of as groups via unicast communication.
The current contribution proposes to include the addressability of V2X UEs via groups for LTE Uu communications.

2. Reason for Change

To provide support for V2X group communication from a V2X application server to one or more V2X UEs over LTE Uu.

3. Conclusions

<Conclusion Part (Optional)>

4. Proposal

It is proposed to agree the following changes to 3GPP TS 23.286 v 1.1.0.

First Change 9.x V2X Group Communication Over LTE Uu
9.x.1 General
The VAE capabilities provide support for V2X group communication from the V2X application server to V2X UEs over LTE Uu.
9.x.2 Information Flows
9.x.2.1 V2X Group Announcement
Table 9.x.2.1-1 describes the information flow for a VAE server to announce a V2X group to the VAE clients.

TABLE 9.x.2.1-1

V2X Group Announcement

| Information element | Status | Description |
| --- | --- | --- |
| V2X Group ID | M | The group ID to be used for the V2X group. |
| V2X service ID list | O | List of V2X services whose service communications are to be enabled on the group. |
| Geo ID list | O | List of geographical areas to be addressed by the group. |
| Identity list | O | List of V2X UE IDs who are member of the group. |

9.x.2.2 V2X Group Registration Request
Table 9.x.2.2-1 describes the information flow for a VAE client to register to a V2X group in response to a V2X group announcement from the VAE server.

TABLE 9.x.2.2-1

V2X Group Registration Request

| Information element | Status | Description |
| --- | --- | --- |
| V2X UE ID | M | Identity of the V2X UE registering to the V2X group. |
| V2X Group ID | M | The group ID to be registered by the V2X UE for the V2X group. |

9.x.2.3 V2X Group Registration Response
Table 9.x.2.3-1 describes the information flow for a VAE server to respond for a group registration request from the VAE client.

TABLE 9.x.2.3-1

V2X Group Registration Response

| Information element | Status | Description |
| --- | --- | --- |
| Result | O | Result from the VAE server in response to V2X group registration request indicating success or failure |

9.x.2.4 V2X Group Message
Table 9.x.2.3-1 describes the information flow for a VAE server to deliver a V2X message to a group of VAE clients.

TABLE 9.x.2.4-1:

V2X Group Message

| Information element | Status | Description |
| --- | --- | --- |
| V2X Group ID | M | The group ID to be used for the V2X group. |
| V2X Message | M | V2X message payload (e.g. ETSI ITS DENM [X]) |
| V2X service ID | O | V2X service ID, the V2X UE is interested in receiving (e.g. PSID or ITS AID of ETSI ITS DENM, ETSI ITS CAM) |
| Geo ID | O | Geographical area identifier (e.g. subscription URI, tile identifier, geo-fence tile identifier) |

9.x.3 V2X Group Establishment
9.x.3.1 General
This subclause describes the procedures for establishing V2X group communication from the VAE server to the VAE clients.

9.4.3.2 Procedure
Pre-Conditions:
1. The VAE client has discovered the VAE server as described in subclause 9.1.2.

Figure 9.x.3.2-1 (FIG. 4): Procedure for Establishing V2X Group Communication Between the VAE Server and VAE Client
1. The V2X application-specific server configures V2X group for LTE Uu communication defined by V2X Group ID for one or more V2X services with list of V2X Service ID with the VAE server.
2. The VAE server announces the V2X Group to the VAE clients.
3. The VAE client registers to V2X group communication using the V2X Group ID.
4. The VAE server sends a V2X group registration response to the VAE client.

9.x.4 V2X Group Message Distribution
9.x.4.1 General
This subclause describes the procedures for V2X group delivery from the VAE server to the VAE clients.
9.x.4.2 Procedure
Pre-Conditions:
1. The VAE client has registered for receiving V2X group messages as described in subclause 9.x.3.

Figure 9.x.4.2-1 (FIG. 5): Procedure for Delivering V2X Group Messages to VAE Clients
1. The V2X application-specific server provides a V2X message for distribution to V2X group with V2X Group ID.
2. The VAE server delivers the V2X message to all registered VAE clients with V2X Group ID.
3. The VAE client provides the V2X message to the V2X application-specific client.

Next Change

REFERENCES

The following documents contain provisions which, through reference in this text, constitute provisions of the present document.

References are either specific (identified by date of publication, edition number, version number, etc.) or non-specific.

For a specific reference, subsequent revisions do not apply.

For a non-specific reference, the latest version applies. In the case of a reference to a 3GPP document (including a GSM document), a non-specific reference implicitly refers to the latest version of that document in the same Release as the present document.

[1] 3GPP TR 21.905: "Vocabulary for 3GPP Specifications".
[2] 3GPP TS 22.185: "Service requirements for V2X services; Stage 1".
[3] 3GPP TS 22.186: "Enhancement of 3GPP support for V2X scenarios; Stage 1".
[4] 3GPP TS 23.280: "Common functional architecture to support mission critical services".
[5] 3GPP TS 23.285: "Architecture enhancements for V2X services".
[6] 3GPP TS 23.434: "Service enabler architecture layer for verticals; Functional architecture and information flows; Stage 2".
[7] 3GPP TS 23.468: "Group Communication System Enablers for LTE (GCSE_LTE); Stage 2".
[8] 3GPP TS 23.682: "Architecture enhancements to facilitate communications with packet data networks and applications".
[9] 3GPP TR 23.795: "Study on application layer support for V2X services".
[10] 3GPP TS 26.346: "Multimedia Broadcast/Multicast Service (MBMS); Protocols and codecs".
[11] 3GPP TS 26.348: "Northbound Application Programming Interface (API) for Multimedia Broadcast/Multicast Service (MBMS) at the xMB reference point".
[12] 3GPP TS 29.214: "Policy and Charging Control over Rx reference point".
[13] 3GPP TS 29.468: "Group Communication System Enablers for LTE (GCSE_LTE); MB2 Reference Point; Stage 3".
[14] 3GPP TS 36.300: "Evolved Universal Terrestrial Radio Access (E-UTRA) and Evolved Universal Terrestrial Radio Access Network (E-UTRAN); Overall description; Stage 2".
[15] ETSI TS 102 894-2 (V1.2.1): "Intelligent Transport Systems (ITS); Users and applications requirements; Part 2: Applications and facilities layer common data dictionaryMultimedia Broadcast/Multicast Service (MBMS); Protocols and codecs".
[16] ETSI TS 102 965 (V1.4.1): "Intelligent Transport Systems (ITS); Application Object Identifier (ITS-AID); Registration".
[17] ISO TS 17419: "Intelligent Transport Systems-Cooperative systems-Classification and management of ITS applications in a global context".
[X] ETSI-EN 302 637-3 (V1.3.0): "Intelligent Transport Systems (ITS); Vehicular Communications; Basic Set of Applications; Part 3: Specifications of Decentralized Environmental Notification Basic Service".

Next Change

<Proposed Change in Revision Marks>

The invention claimed is:

1. A method performed by a vehicle to everything (V2X) application server that comprises, a V2X application specific (VAS) server, a V2X application enabling (VAE) server, and a Service Enabler Architecture Layer for Verticals (SEAL) server supporting group management, for handling communication of V2X wireless devices in a wireless communication network, the method comprising:
obtaining data relating to a group of wireless devices by the VAE server;
transmitting, to a plurality of V2X wireless devices, an announcement message comprising the obtained data by the SEAL server supporting the VAE server;
receiving a response to the announcement message from a V2X wireless device of the plurality of V2X wireless devices for registering to the group of wireless devices by the V2X wireless device by the SEAL server; and
responding with a response indicating success or failure of registration of the V2X wireless device by the SEAL server.

2. The method according to claim 1, wherein the obtained data further comprises data describing a service and an indication indicating a geographical area.

3. The method according to claim 2, wherein the obtained data comprises a group identity (ID) and information for the group of wireless devices.

4. The method of claim 3 further comprising constructing the group of wireless devices based on at least one of:
the indication indicating a geographical area;
data describing the service; and
the information for the group of wireless devices comprising the group ID.

5. The method according to claim 2, further comprising:
constructing the group of wireless devices based on the data describing a service and the indication indicating the geographical area.

6. The method according to claim 1, wherein the group of wireless devices has a maximum size of a number of wireless devices.

7. The method according to claim 1, wherein the announcement message is transmitted to the V2X wireless device by cellular unicast or broadcast.

8. The method according to claim 1, wherein the transmitting of the announcement message is triggered by an initial request from the V2X wireless device to form the group of wireless devices.

9. The method according to claim 1, further comprising sending a group message to the V2X wireless device, wherein the group message comprises a group identity (ID).

10. The method according to claim 9, wherein the group message includes different services that correspond to different geographical areas.

11. A method performed by a vehicle to everything (V2X) wireless device for handling V2X communication service in a wireless communication network by communicating with a V2X application server that comprises, a V2X application specific (VAS) server, a V2X application enabling (VAE) server, and a Service Enabler Architecture Layer for Verticals (SEAL) server supporting group management, the method comprising:
receiving an announcement message relating to a group of wireless devices forming a group, wherein the group is configured by obtaining data relating to the group of wireless devices by the VAE server and transmitted to the group comprising the obtained data by the SEAL server supporting the VAE server;
transmitting a response to the received announcement message to the V2X application server for registering to the group by the SEAL server; and
receiving a response indicating success or failure of registration of the V2X wireless device to the group by the SEAL server.

12. The method according to claim 11, further comprising:
receiving a group message, wherein the group message comprises a group identity (ID).

13. The method according to claim 11, further comprising:
transmitting a request to form the group.

14. The method according to claim 11, wherein the group has a maximum size of a number of wireless devices.

15. The method according to claim 11, wherein a group message sent to the group includes different services that correspond to different geographical areas.

16. A vehicle to everything (V2X) application server that comprises, a V2X application specific (VAS) server, a V2X application enabling (VAE) server, and a Service Enabler Architecture Layer for Verticals (SEAL) server supporting group management, for handling communication of V2X wireless communication network, the V2X application server comprising:
at least one processor; and
a memory comprising instructions which, when executed by the at least one processor, cause the V2X application server to:
obtain data relating to a group of wireless devices by the VAE server;
transmit, to a plurality of V2X wireless devices, an announcement message comprising the obtained data by the SEAL server supporting the VAE server;
receive a response to the announcement message from a V2X wireless device of the plurality of V2X wireless devices for registering to the group by the V2X wireless device by the SEAL server; and
respond with a response indicating success or failure of registration of the V2X wireless device by the SEAL server.

17. A vehicle to everything (V2X) wireless device for handling V2X communication service in a wireless communication network by communicating with a V2X application server that comprises, a V2X application specific (VAS) server, a V2X application enabling (VAE) server, and a Service Enabler Architecture Layer for Verticals (SEAL) server supporting group management, wherein the V2X wireless device is to:
receive an announcement message relating to a group of wireless devices forming a group, wherein the group is configured by obtaining data relating to the group of wireless devices by the VAE server and transmitted to the group comprising the obtained data by the SEAL server supporting the VAE server;
transmit a response to the received announcement message to the V2X application server for registering to the group by the SEAL server; and
receive a response indicating success or failure of registration of the V2X wireless device to the group by the SEAL server.

* * * * *